US012566394B2

(12) United States Patent
Ito et al.

(10) Patent No.: US 12,566,394 B2
(45) Date of Patent: Mar. 3, 2026

(54) IMAGE FORMING APPARATUS THAT SETS A TARGET TEMPERATURE BASED ON A DEVELOPER AMOUNT IN A DEVELOPER STORAGE PORTION

(71) Applicant: CANON KABUSHIKI KAISHA, Tokyo (JP)

(72) Inventors: Shingo Ito, Tokyo (JP); Ai Suzuki, Tokyo (JP); Hiroko Katagiri, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 18/595,533

(22) Filed: Mar. 5, 2024

(65) Prior Publication Data

US 2024/0310763 A1 Sep. 19, 2024

(30) Foreign Application Priority Data

Mar. 13, 2023 (JP) ................................ 2023-038574

(51) Int. Cl.
*G03G 15/20* (2006.01)
*G03G 9/093* (2006.01)
(Continued)

(52) U.S. Cl.
CPC ....... *G03G 15/205* (2013.01); *G03G 9/09314* (2013.01); *G03G 9/09357* (2013.01);
(Continued)

(58) Field of Classification Search
CPC ............. G03G 15/205; G03G 15/0856; G03G 15/0862; G03G 15/2039; G03G 15/55;
(Continued)

(56) References Cited

U.S. PATENT DOCUMENTS 11,947,280 B2 4/2024 Funatani et al.
2012/0027423 A1 * 2/2012 Kawai .................. G03G 15/556 399/27
(Continued)

FOREIGN PATENT DOCUMENTS

JP H05289460 A 11/1993
JP 2015025841 A 2/2015
JP 2020086450 A 6/2020

*Primary Examiner* — Joseph S Wong
(74) *Attorney, Agent, or Firm* — Venable LLP

(57) ABSTRACT

An image forming apparatus includes an image forming portion including a developer storage portion, a fixing apparatus, a detection portion configured to output a detection signal in accordance with a developer amount in the developer storage portion, and a control portion configured to control a target temperature of the fixing apparatus. The control portion is configured to set the target temperature at a first temperature if the developer amount is a first amount, set the target temperature at a second temperature lower than the first temperature if the developer amount is a second amount smaller than the first amount, and set the target temperature at a third temperature higher than the second temperature if the developer storage portion is supplied with the developer such that the developer amount is increased from the second amount to the first amount.

16 Claims, 12 Drawing Sheets

(51) Int. Cl.
*G03G 15/00* (2006.01)
*G03G 15/08* (2006.01)

(52) U.S. Cl.
CPC ..... *G03G 15/0856* (2013.01); *G03G 15/0862* (2013.01); *G03G 15/2039* (2013.01); *G03G 15/55* (2013.01); *G03G 15/553* (2013.01); *G03G 15/556* (2013.01); *G03G 2215/0888* (2013.01); *G03G 2215/0891* (2013.01); *G03G 2215/20* (2013.01); *G03G 2215/2025* (2013.01)

(58) Field of Classification Search
CPC ............... G03G 15/553; G03G 15/556; G03G 9/09314; G03G 9/09357; G03G 2215/0888; G03G 2215/0891; G03G 2215/20; G03G 2215/2025
See application file for complete search history.

(56) References Cited

U.S. PATENT DOCUMENTS

| | | | | |
|---|---|---|---|---|
| 2018/0149996 | A1* | 5/2018 | Narita .................. | G03G 15/556 |
| 2021/0041803 | A1 | 2/2021 | Kobayashi | |
| 2021/0397114 | A1* | 12/2021 | Fukasawa ............ | G03G 15/205 |
| 2022/0187735 | A1 | 6/2022 | Umeda | |

* cited by examiner

IMAGE FORMING APPARATUS THAT SETS A TARGET TEMPERATURE BASED ON A DEVELOPER AMOUNT IN A DEVELOPER STORAGE PORTION

BACKGROUND OF THE INVENTION

Field of the Invention

The present invention relates to an image forming apparatus that forms images on recording materials.

Description of the Related Art

The electrophotographic image forming apparatus forms images on recording materials by using toner that serves as developer. Japanese Patent Application Publication No. 2020-86450 describes a system (i.e., a toner supply system) in which the toner is supplied from the outside of an image forming apparatus to a developer storage chamber of the image forming apparatus by using a toner bottle. The toner supply system is advantageous for reducing the environmental load because the frequency of replacement of the photosensitive drum and the like is reduced, compared with that in a system in which the process cartridge is replaced.

In recent years, for further reducing the environmental load, it has been desired to reduce the power consumption by decreasing the temperature (i.e., the fixing temperature) at which an image is fixed to a recording material. However, there is a case in which the fixability of fresh toner contained in the developer storage chamber immediately after the supply of the fresh toner is different from the fixability of toner contained in the developer storage chamber after an image forming operation is repeated after the supply of the toner.

SUMMARY OF THE INVENTION

The present invention provides an image forming apparatus that can reduce power consumption while obtaining good fixability.

According to an aspect of the invention, an image forming apparatus includes an image forming portion including a developer storage portion configured to store developer, the image forming portion being configured to form an image on a recording material by using the developer, a fixing apparatus configured to fix the image to the recording material by heating the image, a detection portion configured to output a detection signal in accordance with a developer amount in the developer storage portion, and a control portion configured to control a target temperature of the fixing apparatus depending on the detection signal, wherein the developer storage portion is configured to be supplied with the developer from a supplying container that is outside the image forming apparatus, and wherein the control portion is configured to (i) set the target temperature at a first temperature if the developer amount is a first amount, (ii) set the target temperature at a second temperature lower than the first temperature if the developer amount is a second amount smaller than the first amount, and (iii) set the target temperature at a third temperature higher than the second temperature if the developer storage portion is supplied with the developer such that the developer amount is increased from the second amount to the first amount.

According to another aspect of the invention, an image forming apparatus includes an apparatus body, an image forming portion including a cartridge that includes a developer storage portion configured to store developer and that is detachably attached to the apparatus body, the image forming portion being configured to form an image on a recording material by using the developer, a fixing apparatus configured to fix the image to the recording material by heating the image, a detection portion configured to output a detection signal in accordance with a developer amount in the developer storage portion, and a control portion configured to control a target temperature of the fixing apparatus depending on the detection signal, wherein the control portion is configured to (i) set the target temperature at a first temperature if the developer amount is a first amount, (ii) set the target temperature at a second temperature lower than the first temperature if the developer amount is a second amount smaller than the first amount, and (iii) set the target temperature at a third temperature higher than the second temperature if the developer amount is increased from the second amount to the first amount.

Further features of the present invention will become apparent from the following description of exemplary embodiments with reference to the attached drawings.

DESCRIPTION OF THE EMBODIMENTS

Hereinafter, some embodiments of the present disclosure will be described with reference to the accompanying drawings.

In the present disclosure, the image forming apparatus is not limited to a single-function printer that includes a printing function alone. For example, the image forming apparatus may be a copying machine that includes a copy function, a facsimile, or a multi-function printer that includes a plurality of functions described above.

First Embodiment

Figure 1:
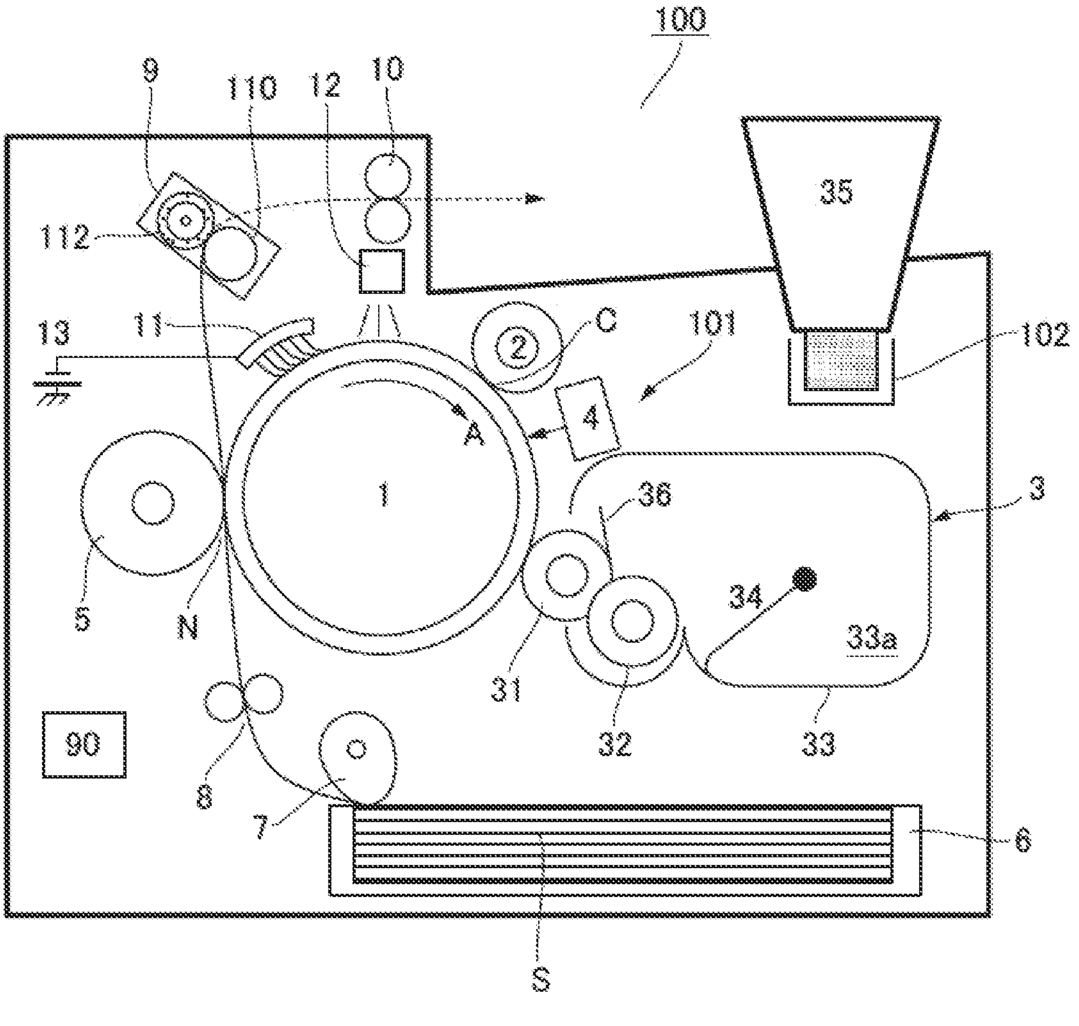
FIG. 1 is a schematic diagram of an image forming apparatus of a first embodiment.

FIG. 1 is a schematic diagram of an image forming apparatus 100 of a first embodiment. The image forming apparatus 100 is a monochrome printer that forms an image on a recording material S by using a single type (i.e., a single color) of toner, which serves as developer. The recording material (recording medium) S may be any one of a variety of sheets with different sizes and materials. For example, the recording material (recording medium) S may be a paper sheet, such as a plain paper sheet or a thick paper sheet, a sheet material, such as a coated paper sheet, on which certain surface treatment has been performed, a specially-shaped sheet material, such as an envelope or an index paper sheet, a plastic film, or a cloth sheet.

The image forming apparatus 100 includes an image forming portion 101 that forms an image (i.e., a toner image or developer image) on the recording material S; a fixing apparatus 9 that fixes the image formed on the recording material S, to the recording material S by heating the image; and a control portion 90. The image forming portion 101 includes a photosensitive drum 1 that serves as an image bearing member, a charging roller 2 that serves as a charging unit, an exposure apparatus 4 that serves as an exposure unit, a developing apparatus 3 that serves as a developing unit, a transfer roller 5 that serves as a transfer unit or transfer member, a brush member 11, and a pre-exposure apparatus 12.

The photosensitive drum 1 is a cylindrically-formed photosensitive member. The photosensitive drum 1 of the present embodiment is a negatively-charged organic photosensitive member. The photosensitive drum 1 has a photosensitive layer formed on a base body that is formed like a drum and made of aluminum. The photosensitive drum 1 is driven and rotated by a driving apparatus in a direction indicated by an arrow A (i.e., a clockwise direction in FIG. 1) at a predetermined circumferential speed (i.e., a process speed).

The charging roller 2 is in contact with the photosensitive drum 1 at a predetermined pressure contact force, and forms a charging portion C. The charging roller 2 is applied with a charging voltage by a charging high-voltage power supply, which serves as a charging-voltage supply portion, and thereby uniformly charges the surface of the photosensitive drum 1 at a predetermined electric potential. In the present embodiment, the photosensitive drum 1 is negatively charged by the charging roller 2, and the charge potential of the photosensitive drum 1 is about −700 V.

In the present embodiment, the exposure apparatus 4 is a laser scanner apparatus. The exposure apparatus 4 outputs a laser beam in accordance with image information sent from an external apparatus, and exposes and scans the surface of the photosensitive drum 1 with the laser beam. With this exposure, an electrostatic latent image (an electrostatic image) is formed on the surface of the photosensitive drum 1 in accordance with the image information. Note that in the present embodiment, the electric potential of the exposed portion is about −100 V Note that the exposure apparatus 4 is not limited to the laser scanner apparatus. For example, the exposure apparatus 4 may be an LED array in which a plurality of LEDs is disposed along the longitudinal direction of the photosensitive drum 1 (i.e., the axial direction of the cylinder).

The developing apparatus 3 includes a developing roller 31, a supplying roller 32, a developer container 33, an agitating member 34, and a developing blade 36. The developer container 33 is a frame of the developing apparatus 3, and rotatably supports the developing roller 31 and the supplying roller 32. In the developer container 33, a developer storage portion 33*a* in which the developer is stored is formed. That is, the image forming portion 101 of the present embodiment includes the developer storage portion 33*a* in which the developer is stored.

The developing roller 31 functions as a developer bearing member that bears the developer. The developing roller 31 is disposed in an opening portion of the developer container 33 so as to face the photosensitive drum 1. The supplying roller 32 functions as a supplying member that supplies the developer to the developing roller 31. The supplying roller 32 is in contact with the developing roller 31 such that the supplying roller 32 can rotate. The toner, which serves as developer stored in the developer storage portion 33*a*, is applied onto the surface of the developing roller 31 by the supplying roller 32. Note that the supplying roller 32 may not be disposed if the developing apparatus 3 has a configuration in which the toner can be sufficiently supplied to the developing roller 31.

The developing apparatus 3 of the present embodiment uses a contact developing system as the developing system. That is, a toner layer borne by the developing roller 31 contacts the photosensitive drum 1 in a developing portion (i.e., a developing area) in which the photosensitive drum 1 and the developing roller 31 face each other. The developing roller 31 is applied with a developing voltage by a developing high-voltage power supply. With the developing voltage applied to the developing roller 31, the toner borne by the developing roller 31 is transferred from the developing roller 31 to the surface of the photosensitive drum 1 in accordance with the electric-potential distribution of the surface of the photosensitive drum 21. In this manner, the electrostatic latent image on the photosensitive drum 1 is developed into a toner image. Note that in the present embodiment, a reversal development method is used. Specifically, since the photosensitive drum 1 is charged in the charging process, and then exposed in the exposure process, the amount of electric charge of an exposed area of the surface of the photosensitive drum 1 decreases. Thus, the toner sticks to the exposed area, so that the toner image is formed.

The developer container 33 is configured so that the toner, which serves as developer, can be supplied from the outside of the image forming apparatus 100 into the developer container 33 (i.e., the developer storage portion 33*a*) by using a toner pack 35 serving as a developer supplying container. The apparatus body of the image forming apparatus 100 is provided with an attachment portion 102 to which the toner pack 35 can be attached. In a state where the toner pack 35 is attached to the attachment portion 102, at least one portion of the toner pack 35 is exposed to the outside of the image forming apparatus 100. Note that an opening-and-closing member (or a cover member) that can move between an opening position, at which the opening-and-closing member exposes the attachment portion 102, and a closing position, at which the opening-and-closing member covers the attachment portion 102, may be disposed in the image forming apparatus 100. The image forming apparatus 100 and the toner pack 35 constitute an image forming system of the present embodiment.

Figure 3A:
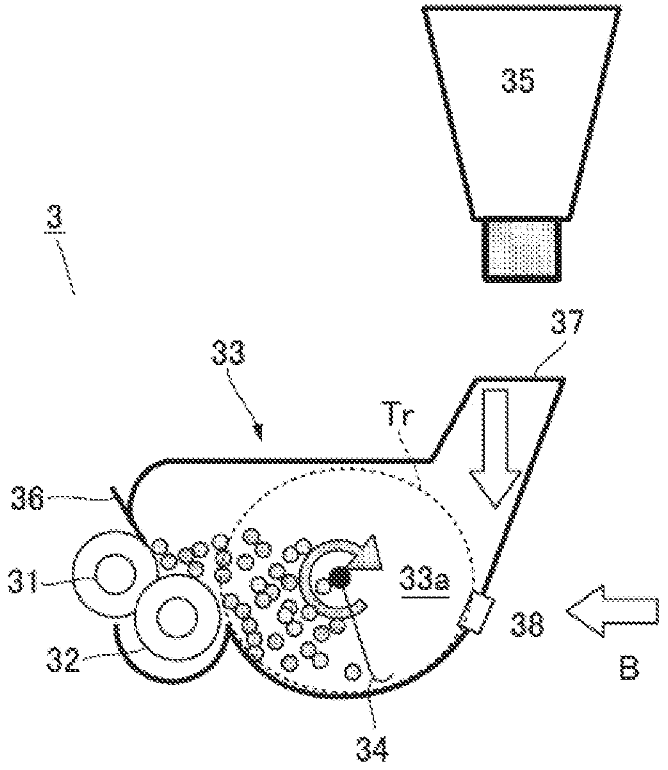
FIG. 3A is a diagram illustrating a developing apparatus of the first embodiment.

FIG. 3A illustrates a detailed diagram of the developing apparatus 3. In an upper portion of the developer container 33, an opening portion (i.e., a supplying inlet 37) is disposed for receiving toner discharged from the toner pack 35 and supplying the toner into the developer storage portion 33*a*. For supplying the toner, a user attaches the toner pack 35 to the attachment portion 102 (FIG. 1), then opens a shutter disposed at an end portion of the toner pack 35, and then causes the toner to flow from the toner pack 35 down to the developer storage portion 33*a*. The toner flows down due to the self weight of the toner, or is caused to flow down by the user deforming the toner pack 35 (that is, squeezing the toner pack 35 or squeezing out the toner) with his/her hand.

The agitating member 34 is disposed in the developer container 33. The agitating member 34 includes a shaft portion that extends substantially parallel with the rotation axis of the developing roller 31, and a blade portion that projects from the shaft portion. The agitating member 34 is driven and rotated by a driving apparatus, and thereby agitates the toner of the developer container 33 and sends the toner toward the developing roller 31 and the supplying roller 32 by using the blade portion. In addition, the agitating member 34 circulates the toner having not been used for the developing operation and removed from the developing roller 31, in the developer container 33; and thereby makes the toner of the developer container 33 uniform. By the agitation by the agitating member 34, the toner suppled from the toner pack 35 and the toner having been stored in the developer storage portion 33*a* are mixed uniformly with each other. Note that the agitating member 34 may not rotate, and may swing.

The developing blade 36 is disposed in the opening portion of the developer container 33 in which the developing roller 31 is disposed. The developing blade 36 is a blade member against which the developer borne by the developing roller 31 is rubbed. The developing blade 36 regulates the amount of toner borne by the developing roller 31 and conveyed to the developing portion. In addition, since the toner borne by the surface of the developing roller 31 is rubbed against the developing blade 36 by the rotation of the developing roller 31, the toner is charged with normal polarity (i.e., negative polarity) by friction.

As illustrated in FIG. 1, the transfer roller 5 is pressed against the photosensitive drum 1, and forms a transfer portion N in which the photosensitive drum 1 and the transfer roller 5 are in pressure contact with each other. The transfer roller 5 is connected with a transfer high-voltage power source that serves as a transfer-voltage applying portion, and is applied with a predetermined voltage (i.e., a transfer voltage) when an image is formed.

The brush member 11 is in contact with the photosensitive drum 1 at a position between the transfer portion N and the charging portion C in the rotational direction of the photosensitive drum 1. The brush member 11 removes paper dust sticking to the photosensitive drum 1. The pre-exposure apparatus 12 emits light to the photosensitive drum 1 at a position between the brush member 11 and the charging portion C in the rotational direction of the photosensitive drum 1. By the light emitted from the pre-exposure apparatus 12 (pre-exposure), the surface potential of the photosensitive drum 1 is removed, so that the stable uniformity in charging is achieved in the charging portion C.

In parallel with the formation of the toner image performed by the image forming portion 101, the conveyance of the recording material S is performed. First, the recording material S stored in a cassette 6 is fed by a feeding unit 7; and then, the recording material S is conveyed to the transfer portion N through a registration roller pair 8. The conveyance of the recording material S is controlled in accordance with the timing at which the toner image formed on the photosensitive drum 1 reaches the transfer portion N. While the recording material S passes through the transfer portion N, the toner image formed on the photosensitive drum 1 is transferred onto the recording material S by the transfer roller 5 that is applied with the transfer voltage.

The recording material S that has passed through the transfer portion N is conveyed to the fixing apparatus 9. The fixing apparatus 9 may be a heat-fixing apparatus (i.e., an image heating apparatus) that fixes an image (i.e., a toner image) formed on the recording material S, to the recording material S by heating the image. The fixing apparatus 9 of the present embodiment has a film-heating system that includes a fixing film 112, a heater 113 (FIG. 2), and a pressing roller 110. The heater 113 is disposed in an internal space of the fixing film 112. The pressing roller 110 and the fixing film 112 form a nip portion (i.e., a fixing nip). The fixing apparatus 9 will be described in detail below.

The fixing apparatus 9 fixes the toner image formed on the recording material S, to the recording material S by heating and pressing the toner image while nipping and conveying the recording material S in the fixing nip. The recording material S that has passed through the fixing apparatus 9 is discharged to the outside of the image forming apparatus 100 by a discharging roller pair 10.

Figure 5:
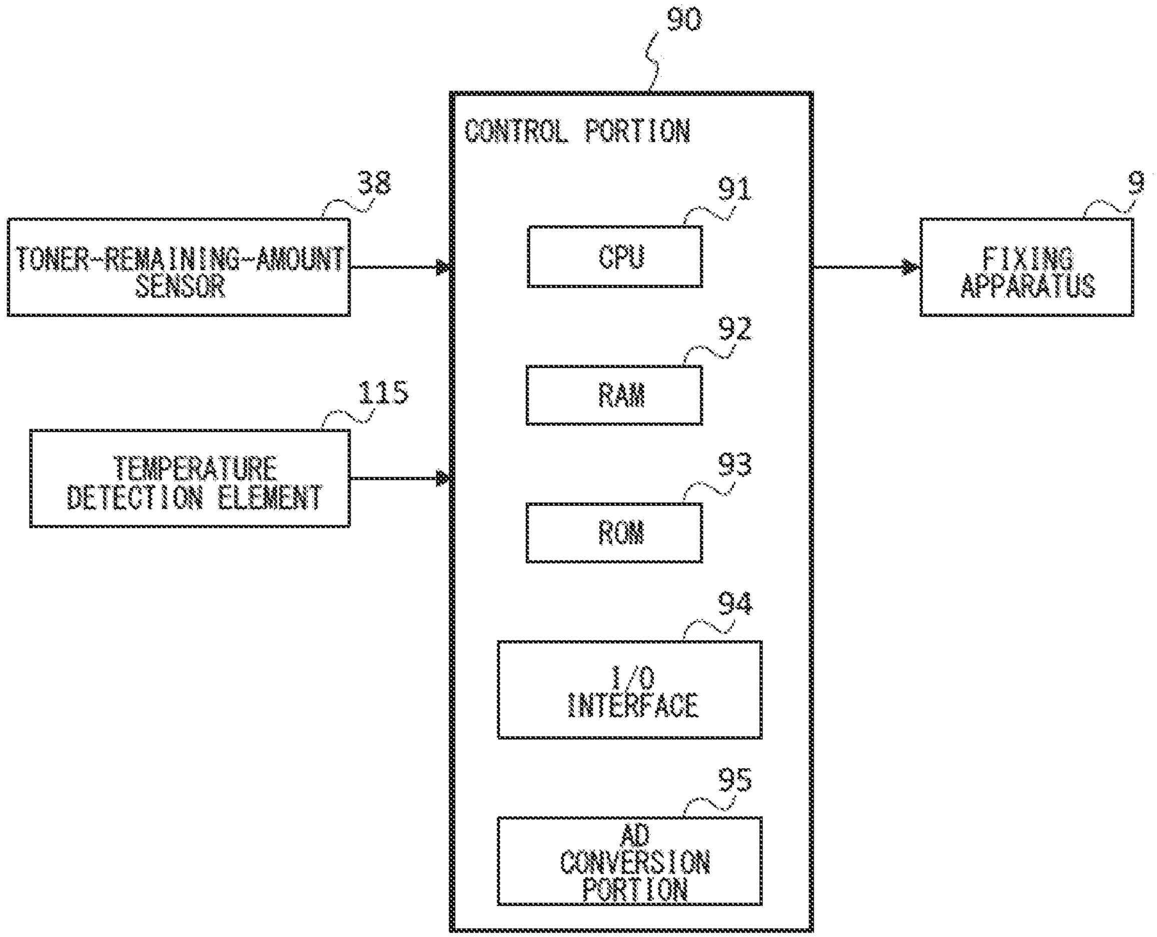
FIG. 5 is a diagram illustrating a control portion of the first embodiment.

As illustrated in FIG. 5, the control portion 90 includes a CPU 91, a RAM 92, a ROM 93, an I/O interface 94, and an AD conversion portion 95. The control portion 90 is an example of a control portion that controls the image forming apparatus 100. The CPU 91 controls the operation of the image forming apparatus 100 in accordance with a program by reading the program stored in the ROM 93 and executing the program in the RAM 92 that serves as a work area. For example, the CPU 91 sets a target temperature (i.e., a fixing temperature) of the fixing apparatus 9 used in the image formation, depending on a detection signal from a below-described toner-remaining-amount sensor 38.

Note that in the present embodiment, a cleanerless system (that performs cleaning simultaneously with the development operation) is used. In the cleanerless system, at least one portion of toner (i.e., transfer residual toner) that has not been transferred onto the recording material S in the transfer portion N is collected in the developer storage portion 33*a* by the developing roller 31 and reused. The brush member 11 allows the passage of the transfer residual toner while blocking the paper dust that has stuck to the photosensitive drum 1 from the recording material S. The brush member 11 is applied by a blush power source 13, with a voltage whose polarity is the same as the normal polarity of the toner. As a result, toner particles of the transfer residual toner that have been charged with abnormal polarity (i.e., positive polarity) can be charged with the normal polarity (i.e., negative polarity). When the transfer residual toner charged with the normal polarity passes through the charging portion C and reaches the developing portion, the transfer residual toner is collected by the developing roller 31 due to a potential difference between the photosensitive drum 1 and the developing roller 31. More specifically, the electric potential of the developing roller 31 is set so as to have the normal polarity (i.e., the negative polarity) of the toner with respect to the electric potential (i.e., a light-area potential) of an exposed portion of the photosensitive drum 1, and so as to have the abnormal polarity (i.e., the positive polarity) with respect to the electric potential (i.e., a dark-area potential) of an un-exposed portion of the photosensitive drum 1. Thus, the transfer residual toner sticking to the un-exposed portion of the photosensitive drum 1 is transferred from the photosensitive drum 1 to the developing roller 31 in the developing portion, and is collected in the developer storage portion 33*a*. The transfer residual toner collected in the developer storage portion 33*a* is agitated and made uniform by the agitating member 34, together with the other toner stored in the developer container 33; and is reused for the image formation.

Fixing Apparatus

Figure 2:
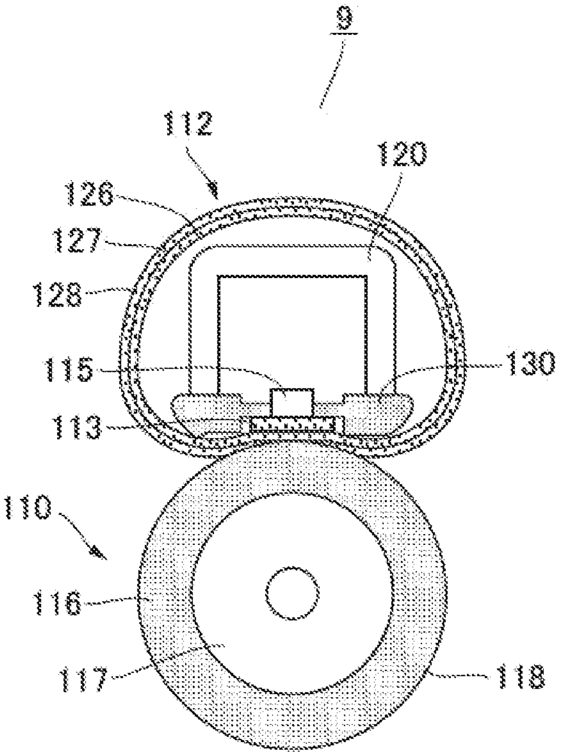
FIG. 2 is a cross-sectional view of a fixing apparatus of the first embodiment.

FIG. 2 is a cross-sectional view illustrating the fixing apparatus 9 of the present embodiment. The fixing apparatus 9 of the present embodiment is a film-heating image heating apparatus. The fixing apparatus 9 includes the fixing film 112, the pressing roller 110, the heater 113, a heater holder 130, a stay 120, and a temperature detection element 115. Hereinafter, the direction of the generating line of the fixing film 112 is defined as the longitudinal direction of the fixing apparatus 9.

The fixing film 112 is a tubular film having flexibility and heat resistance. The heater 113 includes a substrate, and a heat generating resistor disposed on the substrate; and generates heat when the heat generating resistor is energized. The heater 113 is held by the heater holder 130. The heater 113 and the heater holder 130 are disposed in the internal space of the fixing film 112. Preferably, the heater holder 130 is made of a material with low heat capacity that draws less heat from the heater 113. In the present embodiment, the heater holder 130 is made of liquid crystal polymer (LCP) that is a heat-resistant resin.

The heater holder 130 is supported by the stay 120 made of iron, on a side opposite to the side on which the heater 113 is disposed. Thus, the rigidity of the heater holder 130 is reinforced by the stay 120. Both end portions of the stay 120 in the longitudinal direction are urged by pressing springs (not illustrated), toward the pressing roller 110 (i.e., downward in FIG. 2).

The pressing roller 110 is in pressure contact with the heater 113 and the heater holder 130 at a position at which the pressing roller 110 faces the heater 113 via the fixing film 112. With this arrangement, a fixing nip is formed. The fixing nip serves as a nip portion (i.e., a pressure contact portion) formed between the pressing roller 110 and the components that are the heater 113 and the heater holder 130. The heater 113 and the heater holder 130 are an example of a nip forming member that, together with the pressing roller 110 (i.e., a facing member or a pressing member), forms the fixing nip. Note that the heater 113 may not directly be in contact with the inner surface of the fixing film 112. For example, a sheet-like or plate-like sliding member made of a high thermal-conductive material may be disposed between the heater 113 and the fixing film 112.

The pressing roller 110 includes a core metal 117, an elastic layer 116, and a release layer 118. Both end portions of the core metal 117 in the longitudinal direction are supported by bearings fixed to the frame of the fixing apparatus 9. The pressing force that the pressing roller 110 receives from the heater 113 and the heater holder 130 is received by the frame of the fixing apparatus 9 via the bearings. In addition, the pressing roller 110 is driven and rotated by the driving force from a driving apparatus, which is applied to a driving gear disposed at an end portion of the core metal 117. For example, the pressing roller 110 is driven and rotated at a circumferential speed of 150 mm/sec. If the pressing roller 110 is driven and rotated, the fixing film 112 receives the frictional force from the pressing roller 110 in the fixing nip, and rotates in accordance with the rotation of the pressing roller 110.

The fixing film 112 of the present embodiment is an endless (belt-like or tubular) film that has an outer diameter of 20 mm in a state where the fixing film 112 is still not assembled to the fixing apparatus 9 and has a cylindrical shape. The fixing film 112 has a multilayer structure that includes a plurality of layers formed in the thickness direction. The fixing film 112 of the present embodiment includes a base layer 126 for keeping the film strength, a conductive primer layer 127, and a release layer 128 for reducing dirt that sticks to the surface of the fixing film 112.

The base layer 126 is required to have heat resistance because the base layer 126 receives heat from the heater 113. In addition, the base layer 126 is also required to have strength because the base layer 126 slides on the heater 113 in the present embodiment. Preferably, the material of the base layer 126 is a metal, such as stainless used steel (SUS) or nickel, or heat-resistant resin, such as polyimide. Since the metal has higher strength than that of the resin, the fixing film 112 can be made thinner. In addition, since the metal has higher thermal conductivity, the heat from the heater 113 can be easily transmitted to the surface of the fixing film 112. On the other hand, since the resin has a lower specific gravity than that of the metal, it is advantageous that the resin has a lower heat capacity, and is easily warmed. In addition, since the fixing film 112 can be made thin by performing coating molding by using the resin, the fixing film 112 can be made inexpensively.

In the present embodiment, the material of the base layer 126 of the fixing film 112 is polyimide resin. In addition, for increasing the thermal conductivity and strength, a carbon-based filler is added to the polyimide resin. As the thickness of the base layer 126 decreases, the heat from the heater 113 is more easily transmitted to the surface of the fixing film 112. However, if the base layer 126 is made thin, the strength of the base layer 126 decreases. Thus, it is preferable that the thickness of the base layer 126 be about 15 to 100 μm in consideration of the balance between the thermal conductivity and the strength. In the present embodiment, the thickness of the base layer 126 is 60 μm.

The conductive primer layer 127 is a conductive layer which is made of polyimide resin or fluororesin, and whose resistance value is made lower by adding carbon or the like to the conductive layer. Part of the conductive primer layer 127 is exposed to the surface of the fixing film 112. The exposed portion of the conductive primer layer 127 is grounded, so that the electric potential of the fixing film 112 can be stabilized in a state where the recording material S is being conveyed in the fixing nip.

The material of the release layer 128 is preferably a fluororesin, such as perfluoro-alkoxy resin (PFA), polytetrafluoroethylene resin (PTFE), or tetrafluoroethylene-hexafluoropropylene resin (FEP). In the present embodiment, the PFA of the fluororesin is used because it has good releasability and heat resistance. In addition, a conducting material is dispersed in the PFA, so that the PFA has a medium resistance value. The release layer 128 may be a tube which covers the lower layer, or may be a paint with which the surface of the lower layer is coated. In the present embodiment, the release layer 128 is a coating that is advantageous for making the fixing film 112 thinner. As the thickness of the release layer 128 decreases, the heat from the heater 113 is more easily transmitted to the surface of the fixing film 112. However, if the release layer 128 is too thin, the durability of the release layer 128 decreases. Thus, it is preferable that the thickness of the release layer 128 be about 5 to 30 μm in consideration of the balance. In the present embodiment, the thickness of the release layer 128 is 10 μm.

The pressing roller 110 of the present embodiment has an outer diameter of 14 mm. The core metal 117 is made of iron, and formed like a cylinder whose outer diameter is 9 mm. The elastic layer 116 is formed on the outer circumferential surface of the core metal 117. The elastic layer 116 has a thickness of 2.5 mm, and is made of silicone rubber. The material of the elastic layer 116 may be silicone rubber or fluororubber, both of which have heat resistance. In the present embodiment, the material of the elastic layer 116 is silicone rubber. The outer diameter of the pressing roller 110 is about 10 to 50 mm. The heat capacity of the pressing roller 110 decreases as the outer diameter of the pressing roller 110 decreases. However, if the outer diameter is too small, the width of the fixing nip decreases, so that it becomes difficult to achieve the good fixability. Thus, the outer diameter of the pressing roller 110 is required to have an appropriate value. In the present embodiment, the outer diameter of the pressing roller 110 is 14 mm in consideration of the balance between the heat capacity and the fixability. Similarly, if the thickness of the elastic layer 116 is too small, the heat will escape from the elastic layer 116 to the core metal, which is made of metal. Thus, the thickness of the elastic layer 116 is required to have an appropriate value. In the present embodiment, the thickness of the elastic layer 116 is 2.5 mm in consideration of the balance between the heat capacity and the reduction of heat that escapes to the core metal.

The release layer 118 is made of perfluoro-alkoxy resin (PFA). Like the release layer 128 of the fixing film 112, the release layer 118 may be a tube which covers the lower layer, or may be a paint with which the surface of the lower layer is coated. The release layer 118 of the present embodiment is a tube which has good durability, and whose film thickness is 20 μm. The material of the release layer 118 may not be PFA. For example, the material may be a fluororesin, such as PTFE or FEP, or a rubber, such as fluororubber or silicone rubber, which has good releasability. As the surface hardness of the pressing roller 110 decreases, a sufficient width of the fixing nip is obtained with lower pressing force. However, if the surface hardness is too low, the durability of the pressing roller 110 will decrease. Thus, in the present embodiment, the surface hardness of the pressing roller 110 is 40° in Asker-C hardness (load: 600 g), in consideration of the balance.

In the heater 113 of the present embodiment, a plurality of heat generating resistors is arranged serially on a ceramic substrate. Specifically, in the heater 113, heat generating resistors made of Ag/Pd (silver-palladium alloy) are applied, in screen printing, on a surface of the substrate made of alumina; and the heat generating resistors are covered with a glass layer that serves as a heating-element protection layer. The substrate has a width of 6 mm and a thickness of 1 mm, the heat generating resistors have a height of 10 m, and the glass layer has a height of 50 μm.

In addition, for detecting the temperature of the heater 113, the temperature detection element 115 is disposed on a surface of the heater 113 opposite to the surface on which the heat generating resistors are disposed. For example, the temperature detection element 115 is a thermistor. However, the temperature detection element 115 is not limited to this. The temperature detection element 115 may be a thermocouple or a resistance temperature detector, for example. The temperature detection element 115 outputs a signal, such as a voltage signal, that corresponds to the temperature of the heater 113.

The control portion 90 (FIG. 1) of the image forming apparatus 100 controls the target temperature (i.e., the fixing temperature) of the fixing apparatus 9, at which the fixing apparatus 9 fixes an image to a recording material (or forms the image on the recording material), in accordance with the signal outputted from the temperature detection element 115. Specifically, the control portion 90 controls the amount of electric power supplied to the heat generating resistors of the heater 113, so that the surface temperature of the fixing film 112 is kept at a temperature suitable for fixing the image to the recording material. For example, the fixing temperature is about 180° C., and is controlled by below-described control (i.e., fixing-temperature control).

Since the film-heating fixing apparatus 9 heats an image via the fixing film 112 that has a very low heat capacity, the film-heating fixing apparatus 9 is advantageous for reducing the rise time and the power consumption. The below-described fixing-temperature control can further reduce the power consumption while keeping the good fixability. However, this technique may also be applied to another fixing apparatus that has another system other than the film heating system. Examples of the other system other than the film heating system include a heat roller system in which a cylindrical rigid roller is heated by a halogen lamp, and an induction heating (I) system in which a conductive layer of a fixing roller is caused to generate heat by the induction heating.

Toner

The toner of the present embodiment has a specific gravity of 1.1 g/cm$^3$, and the normal charging polarity of the toner is negative polarity. The distribution of the toner particle diameter has a width from about 4 to 8 μm, and the median of the particle diameter distribution is 6 μm. In addition, each of the toner particles of the present embodiment includes a core and a surface layer. The core contains a binding resin and a coloring agent. The surface layer covers the core, and includes projection portions that project from the surface of the toner particle. The toner of the present embodiment has a so-called core-shell structure. In the core-shell structure, the core that has a low glass-transition temperature is covered with the surface layer (i.e., the shell), so that the fixability in a low temperature is increased while the handling of the toner is made easy.

As one method for adjusting the hardness of the surface layer of the toner particle into a predetermined range, the surface layer may be made of a substance, such as an inorganic substance, that has an appropriate hardness, and the chemical structure or the macrostructure of the substance may be controlled so that the surface layer has an appropriate hardness. Specifically, the substance that has an appropriate hardness may be an organosilicon polymer or organopolysiloxane. In this case, the hardness can be adjusted by changing the number of carbon atoms directly bound to the silicon atom, or by changing the carbon chain length. Preferably, the average number of carbon atoms directly bound to a single silicon atom of the organosilicon polymer is equal to or larger than 1 and equal to or smaller than 3. In addition, the average number of carbon atoms directly bound to a single silicon atom of the organosilicon polymer is preferably equal to or larger than 1 and equal to or smaller than 2, and more preferably, is 1.

The projection portions of the surface layer of the toner particle of the present embodiment are made of organosilicon polymer having a structure (i.e., T3 unit structure) expressed by the following formula (1).

$$R\text{—}SiO_{3/2} \tag{1}$$

In the formula (1), R represents an alkyl group containing 1 to 6 carbon atoms or a phenyl group.

Hereinafter, a specific method of manufacturing the toner of the present embodiment will be described as an example. Preferably, the toner of the present embodiment is manufactured as follows: toner particles are manufactured in a water-based medium, and then the projection portions that contain organosilicon polymer are formed on the surface of each toner particle. Among known methods of manufacturing the toner particles, the suspension polymerization method, the dissolution suspension method, or the emulsion aggregation method is preferable. In particular, the suspension polymerization method is preferable for manufacturing the toner particles. In the suspension polymerization method, the organosilicon polymer is easily deposited uniformly on the surface of each toner particle, so that the toner having excellent durability is made stably. Hereinafter, the suspension polymerization method will be further described.

If necessary, a release agent or another resin may be added to a polymerizable monomer composition. After the polymerization process is completed, particles produced are cleaned, collected through filtration, and dried, so that the toner particles are obtained. Note that in the latter half of the above-described polymerization process, the temperature may be increased. In addition, for removing unreacted polymerizable monomer or by-product, part of the medium in which the polymerizable monomer is dispersed may be distilled out of the reaction system in the latter half of the polymerization process or after the polymerization process.

Examples of the above-described release agent include the following substances: petroleum-based wax, such as paraffin wax, microcrystalline wax, or petrolatum, and a derivative of petroleum-based wax; montan wax and a derivative of montan wax; hydrocarbon wax produced by using Fischer-Tropsch process and a derivative of hydrocarbon wax; polyolefin wax, such as polyethylene or polypropylene, and a derivative of polyolefin wax; natural wax, such as carnauba wax or candelilla wax, and a derivative of natural wax; fatty acid, such as higher aliphatic alcohol, stearic acid, or palmitic acid, or a compound of fatty acid; acid amide wax; ester wax; ketone; hydrogenated castor oil and a derivative of hydrogenated castor oil; plant wax; animal wax; and silicone resin. Note that examples of the derivative include an oxide, a block copolymer that involves a vinyl monomer, and a graft-modified product. One of the above-described substances may be used, or may be mixed with another and the mixture may be used.

Examples of the above-described other resin include the following resins (as long as the resins do not affect the advantages of the present embodiment): styrene, such as polystyrene or polyvinyl toluene, and a monopolymer of a substitution product of styrene; styrene-based copolymer, such as styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer, or styrene-maleate ester copolymer; polymethyl methacrylate; polybutyl methacrylate; polyvinyl acetate; polyethylene; polypropylene; polyvinyl butyral; silicone resin; polyester resin; polyamide resin; epoxy resin; polyacrylic resin; rosin; modified rosin; terpene resin; phenol resin; aliphatic or alicyclic hydrocarbon resin; and aromatic petroleum resin. One of the above-described substances may be used, or may be mixed with another and the mixture may be used.

The below-described vinyl polymerizable monomer may suitably be used as the polymerizable monomer in the above-described suspension polymerization method. Examples of the polymerizable monomer include the following substances: styrene; a styrene derivative, such as α-methyl styrene, β-methyl styrene, o-methyl styrene, m-methyl styrene, p-methyl styrene, 2,4-dimethyl stylene, p-n-butyl stylene, p-tert-butyl stylene, p-n-hexyl stylene, p-n-octyl stylene, p-n-nonyl stylene, p-n-decyl stylene, p-n-dodecyl stylene, p-methoxy stylene, or p-phenyl stylene; acrylic polymerizable monomer, such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethylphosphateethyl acrylate, diethylphosphateethyl acrylate, dibutylphosphateethyl acrylate, or 2-benzoyloxyethyl acrylate; methacrylic polymerizable monomer, such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethylphosphateethyl methacrylate, or dibutylphosphateethyl methacrylate; methylene aliphatic monocarboxylic acid esters; vinyl ester, such as vinyl acetate, vinyl propionate, vinyl butyrate, vinyl benzoate, or vinyl formate; vinyl ether, such as vinyl methyl ether, vinyl ethyl ether, or vinyl isobutyl ether; vinyl ketone, such as vinyl methyl ketone, vinyl hexyl ketone, or vinyl isopropyl ketone.

Among the above-described vinyl polymers, a styrene polymer, a styrene-acrylic copolymer, or a styrene-methacryl copolymer is preferable.

In addition, a polymerization initiator may be added for the polymerization of the polymerizable monomer. Examples of the polymerization initiator include the following substances: an azo or diazo polymerization initiator, such as 2,2'-azobis-(2,4-divaleronitrile), 2,2'-azobisisobutyronitrile, 1,1'-azobis(cyclohexane-1-carbonitrile), 2,2'-azobis-4-methoxy-2,4-dimethylvaleronitrile, or azobisisobutyronitrile; and a peroxide polymerization initiator, such as benzoyl peroxide, methyl ethyl ketone peroxide, diisopropyl oxycarbonate, cumene hydroperoxide, 2,4-dichlorobenzoyl peroxide, or lauroyl peroxide. Preferably, each of the above-described polymerization initiators is added to the polymerizable monomer by 0.5 to 30.0 mass %. One of the above-described polymerization initiators may be used, or may be used together with another.

In addition, for controlling the molecular weight of the binding resin of each toner particle, a chain transfer agent may be added in the polymerization of the polymerizable monomer. Preferably, the amount of addition of the chain transfer agent is 0.001 to 15.000 mass % of the polymerizable monomer.

In another case, for controlling the molecular weight of the binding resin of each toner particle, a crosslinker may be added in the polymerization of the polymerizable monomer. Examples of the crosslinking monomer include the following substances: divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylate of each of polyethylene glycols #200, #400, and #600, dipropylene glycol diacrylate, polypropylene glycol diacrylate, polyester type diacrylate (MANDA made by Nippon Kayaku Co., Ltd.), and a methacrylate converted from one of the above-described acrylates.

Examples of the polyfunctional crosslinking monomer include the following substances: pentaerythritol triacrylate, trimethylolethane triacrylate, trimethylolpropane triacrylate, tetramethylolmethane tetraacrylate, oligoester acrylate, methacrylate of oligoester acrylate, 2,2-bis(4-methacryloxy-polyethoxyphenyl)propane, diacrylic phthalate, triallyl cyanurate, triallyl isocyanurate, triallyl trimellitate, and diallyl chlorindate. Preferably, the amount of addition of the polyfunctional crosslinking monomer is 0.001 to 15.000 mass % of the polymerizable monomer.

If the medium used for the above-described suspension polymerization method is a water-based medium, any of the following substances can be used as a dispersion stabilizer for particles of the polymerizable monomer composition. Examples of the substances include tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina. In addition, examples of organic dispersion stabilizers include the following substances: polyvinyl alcohol, gelatine, methylcellulose, methylhydroxypropylcellulose, ethylcellulose, a sodium salt of carboxymethylcellulose, and starch.

In addition, a commercially-available nonionic, anionic, or cationic surfactant may be used. Examples of such a surfactant include the following substances: sodium dodecyl sulfate, sodium tetradecyl sulfate, sodium pentadecyl sulfate, sodium octyl sulfate, sodium oleate, sodium laurate, and potassium stearate.

The coloring agent used for the toner of the present embodiment is not limited to a specific coloring agent, and may be any of the known coloring agents. Preferably, the content of the coloring agent is 3.0 to 15.0 parts by mass with respect to 100 parts by mass of the binding resin or the polymerizable monomer.

In addition, a charge control agent may be used for manufacturing the toner of the present embodiment. The charge control agent may be any of known charge control agents. Preferably, the amount of addition of the charge control agent is 0.01 to 10.00 parts by mass with respect to 100 parts by mass of the binding resin or the polymerizable monomer.

In a preferable method of forming the projection portions, made of organosilicon polymer, on the surface of each toner base particles prepared by the above-described suspension-polymerization method, a toner-base-particle dispersion liquid is made by dispersing the toner base particles in a water-based medium, and then a toner-particle dispersion liquid is made by forming the projection portions by adding the organosilicon compound to the toner-base-particle dispersion liquid.

Preferably, the solid content concentration of the toner-base-particle dispersion liquid is adjusted into a range equal to or higher than 25 mass % and equal to or lower than 50 mass %. In addition, it is preferable that the temperature of the toner-base-particle dispersion liquid be adjusted to a temperature equal to or higher than 35° C. In addition, it is preferable that the pH of the toner-base-particle dispersion liquid be adjusted to a pH in which the condensation of the organosilicon compound hardly proceeds. Since the pH in which the condensation of the organosilicon polymer hardly proceeds varies depending on the substance, it is preferable that the pH be in a range of ±0.5 with respect to a pH at which the condensation proceeds least.

In addition, it is preferable that the organosilicon compound be used after undergoing the hydrolysis process. For example, in the pretreatment for the organosilicon compound, the organosilicon compound is hydrolyzed in another container. For the preparation concentration for the hydrolysis, it is preferable that the amount of water from which ion components, such as ion exchanged water or reverse osmosis (RO) water, are removed be equal to or larger than 40 parts by mass and equal to or smaller than 500 parts by mass, with respect to the amount of the organosilicon compound that is 100 parts by mass. More preferably, the amount of the water is equal to or larger than 100 parts by mass and equal to or smaller than 400 parts by mass. Preferably, the hydrolysis is performed under the condition in which the pH is 2 to 7, the temperature is 15 to 80° C., and the time is 30 to 600 minutes.

The hydrolyzed solution obtained in the manner and the toner-particle dispersion liquid are mixed with each other, and the pH of the mixture is adjusted to a pH suitable for the condensation (the pH is preferably 6 to 12, or 1 to 3, more preferably, 8 to 12). The amount of the hydrolyzed solution is adjusted so that the amount of the organosilicon compound is equal to or larger than 5.0 parts by mass and equal to or smaller than 30.0 parts by mass, with respect to the amount of the toner particles that is 100 parts by mass. With this adjustment, the projection portions are easily formed. Preferably, the formation of the projection portions and the condensation are performed in a period of time equal to or longer than 60 minutes, at a temperature equal to or higher than 35° C.

For controlling the formation of the projection portions formed on the surface of each of the toner particles, it is preferable that the pH be adjusted in two stages. The formation of the projection portions formed of the surface of each of the toner particles can be controlled by condensing the organosilicon compound by appropriately adjusting a hold time taken before an adjustment of the pH and a hold time in the second stage taken before the adjustment of the pH. The formation of the projection portions can also be controlled by adjusting the condensation temperature of the organic compound in a range equal to or higher than 35° C. and equal to or lower than 80° C.

The projection height of the projection portions formed on the surface of each of the toner particles in this manner is about 30 to 300 nm.

If necessary, any of various types of organic or inorganic fine powder may be added to the toner particles. Preferably, the particle diameter of the organic or inorganic fine powder is equal to or smaller than one tenth of the weight average particle diameter of the toner particles in consideration of the durability of the toner particles added with the organic or inorganic fine powder.

Examples of the organic or inorganic fine powder include the following substances.

(1) fluidity imparting agent: silica, alumina, titanium oxide, carbon black, and carbon fluoride (2) abrasive: metal oxide (such as strontium titanate, cerium oxide, alumina, magnesium oxide, or chromium oxide), nitride (such as silicon nitride), carbide (such as silicon carbide), and metallic salt (such as calcium sulfate, barium sulfate, or calcium carbonate)

(3) lubricant: fluorine-based resin powder (such as vinylidene fluoride or polytetrafluoroethylene), and fatty acid metal salt (such as zinc stearate or calcium stearate)

(4) charge control particles: metal oxide (such as tin oxide, titanium oxide, zinc oxide, silica, or alumina) and carbon black The organic or inorganic fine powder may be used for treating the surface of the toner particles for improving the fluidity of the toner and for uniformly charging the toner particles. Examples of treatment agent used for the hydrophobic treatment of the organic or inorganic fine powder include unmodified silicone varnish, various types of modified silicone varnish, unmodified silicone oil, various types of modified silicone oil, silane compound, silane coupling agent, another organosilicon compound, and an organotitanium compound. One of the above-described treatment agents may be used, or may be used together with another.

The toner of the present embodiment is a nonmagnetic one-component developer that contains no magnetic component, and that is held by the developing roller 31, mainly by the intermolecular force or the electrostatic force (image force). However, a one-component developer that contains magnetic component may be used. The one-component developer may contain not only toner particles but also additives (e.g., wax and silica fine particles) for adjusting the fluidity and charging capability of the toner. In another case, a two-component developer that contains nonmagnetic toner and magnetic carrier may be used as the developer. In a case where the magnetic developer is used, a cylindrical developing sleeve, in which a magnet is disposed as an example, is used as the developer bearing member.

Toner-Remaining-Amount Detection Method

Figure 3B:
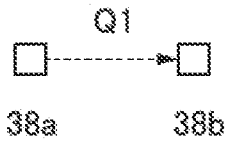
FIG. 3B is a diagram illustrating a toner-remaining-amount sensor.
Figure 4:
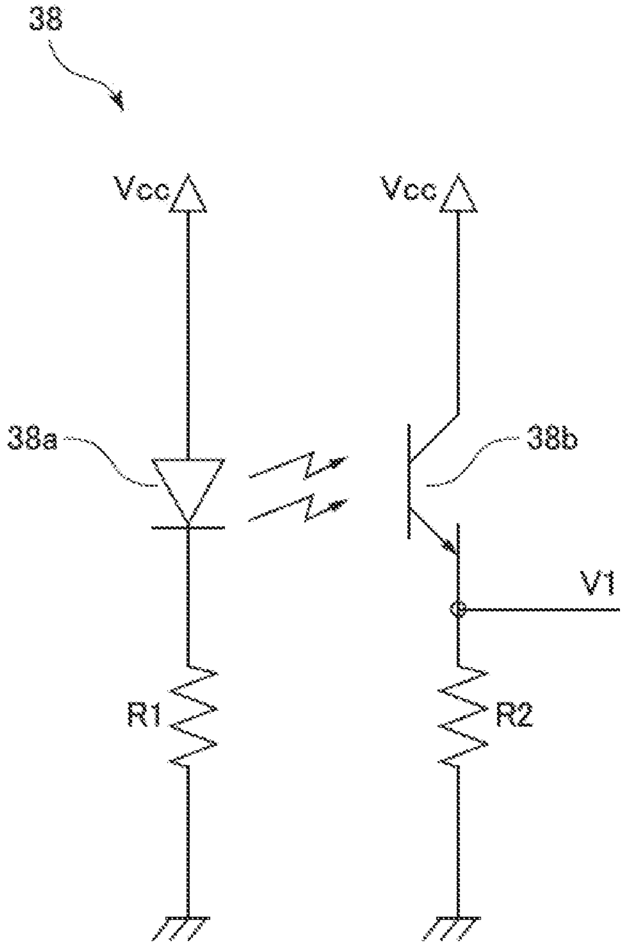
FIG. 4 is a circuit diagram of the toner-remaining-amount sensor of the first embodiment.

Next, a method of detecting the amount of developer (hereinafter referred to as a toner remaining amount) contained in the developer container (developer storage portion) 33 will be described with reference to FIGS. 3A, 3B, and 4. FIG. 3B is a schematic diagram illustrating the toner-remaining-amount sensor 38 viewed in a direction indicated by an arrow B of FIG. 3A. FIG. 4 is a circuit diagram indicating one example of a circuit configuration of the toner-remaining-amount sensor 38.

As illustrated in FIGS. 3A and 3B, the image forming apparatus 100 includes the toner-remaining-amount sensor 38 that serves as a detection portion that outputs a signal in accordance with the amount of remaining toner contained in the developer container 33. As illustrated in FIG. 3B, the toner-remaining-amount sensor 38 includes a light emitting portion 38*a* that emits light, and a light receiving portion 38*b* that detects the light incident thereon.

In an example illustrated in FIG. 4, an LED is used in the light emitting portion 38*a*, and a phototransistor that turns ON when receiving the light is used in the light receiving portion 38*b*. However, the present disclosure is not limited to this. For example, a halogen lamp or a fluorescent lamp may be used in the light emitting portion 38*a*, and a photodiode or an avalanche photodiode may be used in the light receiving portion 38*b*. Note that a switch (not illustrated) is disposed between the light emitting portion 38*a* and a power supply voltage Vcc. Thus, if the switch is turned ON, the power supply voltage Vcc is applied to the light emitting portion 38*a*, so that the light emitting portion 38*a* enters a conduction state (i.e., a light emitting state). In addition, a switch (not illustrated) is also disposed between the light receiving portion 38*b* and the power supply voltage Vcc. Thus, if the switch is turned ON, the current flows through the light receiving portion 38*b* in accordance with the amount of light detected by the light receiving portion 38*b*, so that the light receiving portion 38*b* enters a conduction state.

The light emitting portion 38*a* is connected with the power supply voltage Vcc and a current-limiting resistor R1. The light emitting portion 38*a* emits light that is determined by the power supply voltage Vcc and the current-limiting resistor R1. As illustrated in FIG. 3B, the light emitted from the light emitting portion 38*a* travels along an optical path Q1 that passes through an interior space of the developer container 33, and enters the light receiving portion 38*b*. The collector terminal of the light receiving portion 38*b* is connected with the power supply for supplying the power supply voltage Vcc, and the emitter terminal of the light receiving portion 38*b* is connected with a detection resistor R2. If the light receiving portion 38*b* that is a phototransistor receives the light, the light receiving portion 38*b* outputs a signal (i.e., a current) in accordance with the amount of light received by the light receiving portion 38*b*. The signal is converted to a voltage V1 by the detection resistor R2, then sent to the AD conversion portion 95 of the control portion 90 (see FIG. 5), and then converted to a digital signal by the AD conversion portion 95.

The CPU 91 of the control portion 90 determines whether the light receiving portion 38*b* has received the light from the light emitting portion 38*a*, depending on a signal sent to the CPU 91 via the AD conversion portion 95. In a period of time in which the agitating member 34 agitates the toner of the developer container 33 in a predetermined time, the CPU 91 calculates the amount of toner remaining in the developer container 33 (i.e., the developer amount), depending on the length of time in which the light receiving portion 38*b* receives the light, and on the intensity of the light received by the light receiving portion 38*b*. For example, a table that indicates the relationship between the light receiving time and light intensity and the toner remaining amount is stored in advance in the ROM 93 (the light receiving time and light intensity are parameters obtained in a period of time in which the agitating member 34 agitates the toner). The CPU 91 refers to the table, and determines the current toner remaining amount, depending on the signal sent to the CPU 91 via the AD conversion portion 95.

More specifically, the optical path Q1 of the toner-remaining-amount sensor 38 is set so as to cross a trajectory Tr of rotation of the agitating member 34 when viewed from the rotation-axis direction of the agitating member 34 illustrated in FIG. 3A. The time in which the optical path Q1 is blocked by the toner conveyed by the agitating member 34 when the agitating member 34 makes one revolution, that is, the time in which the light receiving portion 38*b* does not receive the light from the light emitting portion 38*a* changes, depending on the toner remaining amount. In addition, the light intensity detected by the light receiving portion 38*b* also changes, depending on the toner remaining amount.

That is, if the toner remaining amount increases, the optical path Q1 is more easily blocked by the toner. Thus, the light receiving time of the light receiving portion 38*b* and the light intensity detected by the light receiving portion 38*b* decrease. In contrast, if the toner remaining amount decreases, the light receiving time of the light receiving portion 38*b* and the light intensity detected by the light receiving portion 38*b* increase. In this manner, the control portion 90 can determine the toner-remaining-amount level, depending on the light receiving time of the light receiving portion 38*b* and the light intensity detected by the light receiving portion 38*b*.

Note that the method of detecting or estimating the toner remaining amount is not limited to the optical toner-remaining-amount detection method described with reference to FIGS. 3A to 5, and may be performed by any one of detection portions (or estimation portions) having various known systems for detecting the toner remaining amount. For example, the toner remaining amount may be detected by measuring a capacitance between two or more metal plates or conductive resin sheets disposed on the inner wall of the developer container 33 and extending in the longitudinal direction of the developing roller 31. In another case, a load cell may be disposed at a position at which the load cell supports the developing apparatus 3 from below. In this case, the toner remaining amount may be calculated by the CPU 91 subtracting the weight of the developing apparatus 3 that contains no toner, from the weight measured by the load cell. In another case, the amount of consumed toner may be estimated by using the number of printed pixels of images used for image forming operations. In another case, the toner remaining amount may be detected or estimated by using a combination of the above-described methods.

If an image forming operation is repeated by the image forming apparatus 100, the toner contained in the developer container 33 is consumed gradually. If the amount of toner contained in the developer container 33 becomes smaller than a predetermined threshold value Mout, the amount of toner applied onto the developing roller 31 becomes insufficient. In this case, an image defect may occur. For example, an image becomes light in color, or is spotted with white discoloration. However, in the present embodiment, since the above-described detection portion for detecting the toner remaining amount is disposed, the CPU 91 can inform (i.e., perform a notification) a user to supply toner before the toner remaining amount becomes lower than the threshold value Mout. The notification may be performed by using any one of various methods. For example, the notification may be displayed on a display apparatus included in the image forming apparatus 100, may be performed as a voice notification, or may be performed via an external apparatus communicatively connected with the image forming apparatus 100. In a case where the notification is displayed on the above-described display apparatus, letters or an image may be displayed on a screen such as a liquid crystal panel, or an LED lamp (i.e., a supplying lamp) exposed to the exterior surface of the image forming apparatus 100 may be turned ON or caused to blink. A user can supply the toner by using the toner pack 35 every time the user receives the notification, so that the image forming apparatus 100 can output images stably for a longer time.

Fixing-Temperature Control

Next, a method of controlling a fixing temperature T in the present embodiment will be described. The fixing temperature T is a target temperature detected by the temperature detection element 115 when the recording material S passes through the fixing nip in the image formation. The control portion 90 controls the energization of the heater 113 such that the temperature detected by the temperature detection element 115 is kept at the fixing temperature T.

Figure 6A:
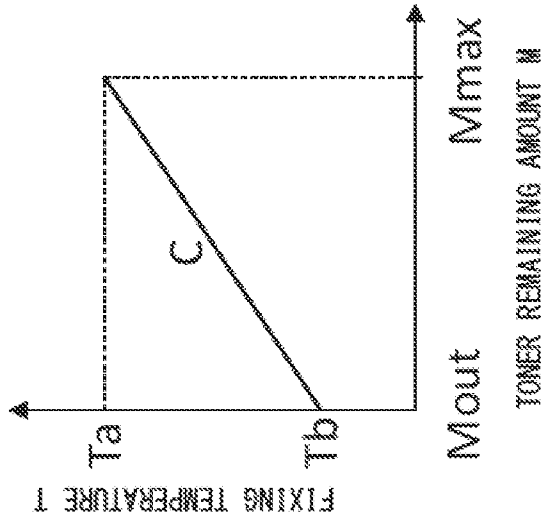
FIG. 6A is a diagram illustrating a relationship between the toner remaining amount and the fixing temperature in the first embodiment.

In the present embodiment, the CPU 91 sets the fixing temperature T, depending on a toner remaining amount M that is detected (estimated) by using the toner-remaining-amount sensor 38. As illustrated in FIG. 6A and expressed by the following equation (2), the relationship between the toner remaining amount M and the fixing temperature T (° C.) is a linear relationship with a slope C. In other words, in the present embodiment, the target temperature is set so that the target temperature (i.e., the fixing temperature T) decreases with the predetermined slope C as the amount of developer contained in the developer storage portion decreases.

$$T = Tb + C \times (M - Mout) \quad (2)$$

In the equation (2), C=(Ta−Tb)/(Mmax−Mout).

The parameter Mmax is an upper limit of the toner remaining amount M in the developer storage portion 33*a*, and the parameter Mout is a threshold value of the toner remaining amount M at which the notification is performed for supplying the toner (that is, the parameter Mout is an allowable lower limit of the toner remaining amount M). In the present embodiment, in the initial state of the image forming apparatus 100, the toner remaining amount M of the toner contained in the developer container 33 is Mmax. In addition, in the image forming apparatus 100 of the present embodiment, if an image with a coverage of 4% that conforms to ISO 19752 has been printed on 5,000 sheets since the toner remaining amount M was Mmax, the toner remaining amount becomes Mout.

In the present embodiment, as illustrated in FIG. 6A, the fixing temperature T is set so that the fixing temperature T is Ta when the toner remaining amount M is Mmax, and is Tb when the toner remaining amount M is Mout. The fixing temperature Tb is lower than the fixing temperature Ta. In the present embodiment, the fixing temperature T decreases monotonously as the toner remaining amount M decreases. In addition, if the toner remaining amount M is increased by supplying toner into the developer storage portion 33*a*, the fixing temperature T is increased.

In the present embodiment, depending on the above-described relationship, the target temperature (i.e., the fixing temperature T) is controlled, as described below, in accordance with the developer amount (i.e., the toner remaining amount M). If the above-described developer amount is a first amount (e.g., Mmax), the above-described target temperature is set at a first temperature (Ta). In addition, if the above-described developer amount is a second amount (e.g., Mout) smaller than the first amount, the target temperature is set at a second temperature (Tb) lower than the first temperature. If the above-described developer amount becomes smaller than the second amount (or if the above-described developer amount is equal to or smaller than the second amount), a notification (i.e., a notification for supplying toner) for informing a user to supply the developer is performed. If the above-described developer amount is increased from the second amount or an amount smaller the second amount, to the first amount (Mmax) by supplying the developer, the above-described target temperature is set at a third temperature higher than the second temperature. In the present embodiment, the third temperature higher than the second temperature is equal to the above-described first temperature (Ta).

In the present embodiment, the fixing-temperature control is performed such that the fixing temperature T is decreased monotonously as the toner remaining amount M of toner contained in the developer container 33 decreases, and that if the toner remaining amount M is increased by supplying the toner, the fixing temperature T is set higher than a fixing temperature obtained before the toner is supplied. In this manner, the power consumption can be reduced while the good fixability can be obtained.

Verification Test

For verifying the present embodiment, a durability test was conducted. The paper sheets used in the test were Canon Red Label Presentation having 80 g/$m^2$. The temperature-and-humidity environment in the test was 23° C. and 50%. The printed image was an image with a coverage of 4% that conforms to ISO 19752. While the toner remaining amount was monitored by using the above-described remaining-amount detection method, the printed image was repeatedly output until the number of printed sheets (i.e., the accumulated number of sheets on which the image was formed) reached 30,000. While the printed image was repeatedly output, the toner was supplied by using the toner pack 35 every time the toner remaining amount was reaching Mout. A single toner pack 35 is filled with toner whose amount corresponds to 5,000 sheets on which the above-described printed image is formed.

Figure 7:
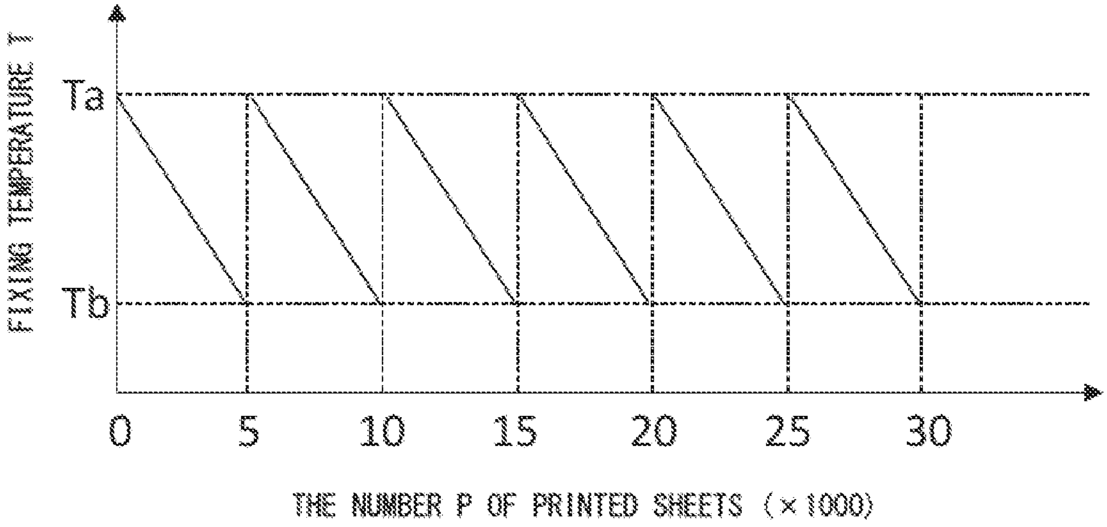
FIG. 7 is a diagram illustrating an example of change in the fixing temperature, in the first embodiment.

FIG. 7 illustrates the change in the fixing temperature Tin the durability test. In FIG. 7, the horizontal axis represents the number P of printed sheets (×1000), and the vertical axis represents the fixing temperature T. Every time the number P of printed sheets increased by 5,000, the toner was supplied and the toner remaining amount M was increased. As described above, in the present embodiment, the fixing temperature T is set so that the fixing temperature T and the toner remaining amount M have a linear relationship (FIG. 6A). Thus, the fixing temperature T changes such that the following cycle is repeated. In the cycle, after the toner is supplied, the fixing temperature T decreases monotonously from Ta to Tb as the toner remaining amount M decreases, and at a timing at which the toner remaining amount M is increased by supplying the toner, the fixing temperature T returns from Tb to Ta (FIG. 7).

During the durability test, a solid black image (i.e., an image painted over with black at the maximum density) was outputted every time the number P of printed sheets increased by 1,000, and before and after the toner was supplied, for checking the fixability. In the present embodiment, the failure of fixing did not occur at any timing in the durability test.

Comparative Example 1

Figure 6B:
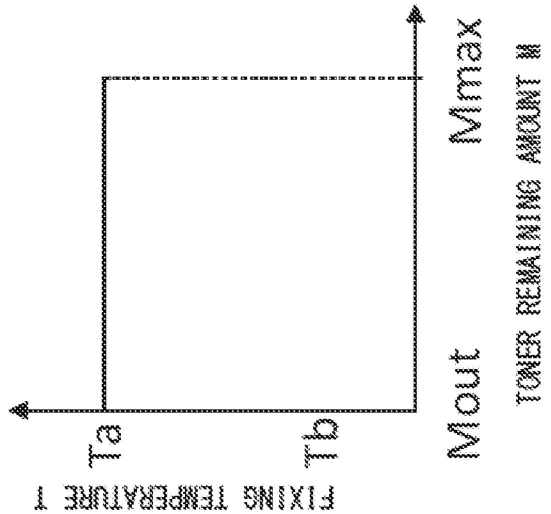
FIG. 6B is a diagram illustrating a relationship between the toner remaining amount and the fixing temperature in Comparative Example 1.

In Comparative Example 1, as illustrated in FIG. 6B, the fixing temperature T was kept at a constant temperature Ta, regardless of the toner remaining amount M. The temperature Ta is equal to the fixing temperature T obtained when the toner remaining amount M is Mmax in the first embodiment. Except for the fixing temperature T, the image forming apparatus of Comparative Example 1 is the same as that of the first embodiment.

In Comparative Example 1, a durability test that is the same as the durability test of the first embodiment was conducted. As a result, the failure of fixing was not found as in the first embodiment, but the power consumption measured in the durability test was 120% with respect to the power consumption measured in the durability test of the first embodiment. That is, in Comparative Example 1 in which the fixing temperature is kept at a high temperature at which the good fixability can be obtained, the fixing temperature T is set at a temperature higher than a minimum value of temperatures in which the failure of fixing does not occur. In particular, since the fixing temperature T was set in this manner, the power consumption was larger than that of the first embodiment, mainly in a state where a little amount of toner remained. In contrast, in the first embodiment, since the fixing temperature T is set at a value near to the minimum value of temperatures in which the failure of fixing does not occur, the power consumption can be reduced while the good fixability can be obtained.

Comparative Example 2

Figure 6C:
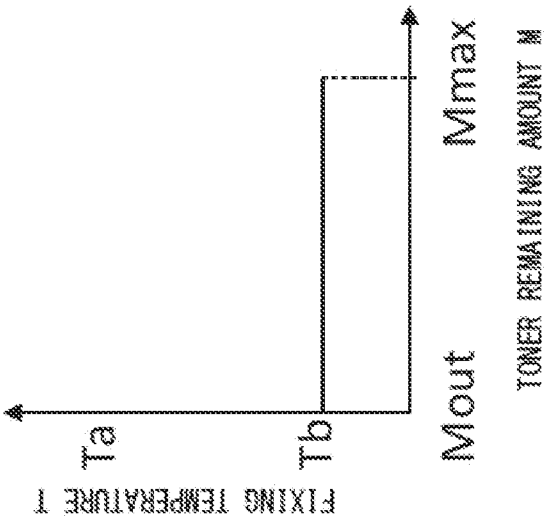
FIG. 6C is a diagram illustrating a relationship between the toner remaining amount and the fixing temperature in Comparative Example 2.

In Comparative Example 2, as illustrated in FIG. 6C, the fixing temperature T was kept at a constant temperature Tb, regardless of the toner remaining amount M. The temperature Tb is equal to the fixing temperature T obtained when the toner remaining amount M is Mout in the first embodiment. Except for the fixing temperature T, the image forming apparatus of Comparative Example 2 is the same as that of the first embodiment.

In Comparative Example 2, a durability test that is the same as the durability test of the first embodiment was conducted. As a result, the failure of fixing occurred immediately after the start of the durability test. Specifically, the toner did not melt sufficiently due to insufficient heat in the fixing nip, and was not sufficiently fixed to the paper sheet. As a result, part of the toner stuck to the fixing film 112, so that a so-called fixing offset (i.e., cold offset) occurred and the solid black image was spotted with white discoloration. As described above, the toner left on the paper sheet was not firmly fixed to the paper sheet. Thus, when the printed image was rubbed with a hand, the toner easily stuck to the hand and the image was disturbed with white discoloration. That is, in Comparative Example 2 in which the fixing temperature is kept at the low temperature, there is a case in which the fixability is impaired although the power consumption can be made lower than that in the first embodiment and Comparative Example 1.

The results in the above-described first embodiment, Comparative Example 1, and Comparative Example 2 mean that the fixability of toner in a low-temperature range is insufficient if the toner is fresh (and contained in the developer storage portion immediately after the supply of toner), and that the failure of fixing occurs if the fixing temperature T is decreased for the fresh toner. In addition, the results mean that since the fixability of toner in the low-temperature range increases while the image forming operation is performed repeatedly after the supply of toner, the failure of fixing will hardly occur even if the fixing temperature T is decreased. Note that the low-temperature range is a temperature range lower than a lower limit of the fixing temperature T at which the sufficient fixability of the fresh toner can be obtained.

In the first embodiment, since the fixing temperature T is changed in accordance with the toner remaining amount M, the fixing temperature T can be controlled in accordance with the change of the fixability of toner in the low-temperature range. In this manner, the excessive electric power can be prevented from being applied to the fixing apparatus 9 while the good fixability can be obtained.

The possible reason that the fixability of toner in the low-temperature range increases while the image forming operation is performed repeatedly after the supply of toner is as follows. That is, the projection portions on the surface of each of the toner particles, and the external additive sticking to the toner particles are reduced, so that it becomes easier for the toner particles to melt because portions of the toner particles with no projection portions and external additive melt easily. The toner of the present embodiment is rubbed against the developing blade 36 when the toner passes through a portion in which the developing roller 31 and the developing blade 36 face each other. As a result, the projection portions and the external additive are removed from the surface layer of each of the toner particles. The projection portions (i.e., particles made of organosilicon polymer) and the external additive separated from the toner particles are moved and supplied, extremely little by little, to the photosensitive drum 1 every time the image forming operation is repeated. Note that the organosilicon-polymer particles and external additive supplied to the photosensitive drum 1 have a function to keep the transferring performance in the transfer portion N (FIG. 1).

In the present embodiment, the fixing temperature T is increased in a state where the developer container 33 contains much fresh toner immediately after the supply of toner and where it is difficult to fix the toner to the sheet. In addition, the fixing temperature T is decreased in a state where the developer container 33 contains less fresh toner after the time has elapsed since the supply of toner and where the fixability in the low-temperature range has increased. In this manner, the power consumption can be reduced while the good fixability can be obtained. In contrast, in Comparative Example 1, the fixing temperature T was kept at the temperature Ta at which the good fixability can be obtained even when the developer container 33 contains much fresh toner. As a result, the excessive electric power was applied to the fixing apparatus 9 in a state where the developer container 33 contained less fresh toner, so that the power consumption was made larger than that in the first embodiment. In Comparative Example 2, the fixing temperature T was kept at the temperature Tb at which the good fixability can be obtained when the developer container 33 contains less fresh toner. As a result, the failure of fixing occurred in a state where the developer container 33 contained much fresh toner.

Comparative Example 3

In Comparative Example 3, a comparative toner was used instead of the toner used in the first embodiment. For making the comparative toner, the polymerization process for the organosilicon polymer was not performed, and the external additive was added, under the following conditions, to the toner base particles made by using the suspension polymerization method.

A 3.0 mass % of hydrophobic sol-gel silica (having a number-average particle diameter of 80 nm and made by NIPPON AEROSIL CO., LTD.) was added to a 100 mass % of toner base particles, and the hydrophobic sol-gel silica and the toner base particles were mixed with each other by using a Henschel mixer. The circumferential speed of the agitating blades was set at 20 m/s.

The fixing-temperature control was performed under the same condition (FIG. 6A) as that in the first embodiment, and the durability test that is the same as that in the first embodiment was conducted. The change in the fixing temperature T in the durability test was the same as that in the first embodiment (FIG. 7).

In Comparative Example 3, the failure of fixing did not occur in the initial stage of the durability test. However, the failure of fixing occurred slightly when the number P of printed sheets reached 3,000. After that, the level of the failure of fixing worsened as the number P of printed sheets reached 4,000, and then 5,000. When the fixing temperature T was set at Ta again immediately after the supply of toner, the fixability was recovered. However, the failure of fixing occurred again when the increase in the number P of printed sheets since the supply of toner reached 3,000, and the durability test was ended at this point of time. The condition of the failure of fixing was the same as that in Comparative Example 2.

The result of Comparative Example 3 suggests that if the comparative toner is fresh, the fixability of the comparative toner is almost equal to the fixability of the toner of the first embodiment. However, the result also suggests that the fixability of the comparative toner in the low-temperature range does not increase even if the image forming operation is performed repeatedly. Thus, if the fixing-temperature control as illustrated in FIG. 7 is performed as in the first embodiment, the failure of fixing occurs when the fixing temperature T becomes lower than a temperature range (from a temperature slightly higher than Ta to a temperature slightly lower than Ta) suitable for fixing the comparative toner to the sheet. As described above, the fixability of the comparative toner in the low-temperature range does not increase even if the image forming operation is performed repeatedly. The present inventors assume that this is because the above-described external additive is buried in the toner base particles during the image forming operation, inhibiting the melt of the toner in the fixing process. Since part of the external additive is moved to the photosensitive drum 1 and the like, and the amount of the external additive on the toner surface decreases slightly, the decrease in the external additive may be a factor that increases the fixability of the comparative toner in the low-temperature range, as in the first embodiment. However, since the effect for inhibiting the toner from melting and caused by the external additive buried in the toner particles is larger than the effect for facilitating the toner to melt and caused by the reduction of the amount of external additive, it is conceived that the comparative toner was not easily fixed to the sheet even if the image forming operation was performed repeatedly.

In contrast to this, since the projection portions of the first embodiment, which are made of organosilicon polymer, are very stable, the external additive is hardly buried in the toner base particles in the image forming operation. Thus, in the first embodiment, it is considered that the effect for facilitating the toner to melt and caused by the reduction of the projection portions, made of organosilicon polymer, and the external additive became dominant, increasing the fixability of toner in the low-temperature range when the image forming operation was performed repeatedly.

As described above, in the first embodiment, the target temperature of the fixing apparatus is decreased monotonously as the developer amount of the developer storage portion decreases, and when the developer amount is increased by supplying the developer, the target temperature is increased from a temperature obtained before the supply of the developer. In this manner, the image forming apparatus can reduce the power consumption while obtaining the good fixability.

In the first embodiment, the developer is, for example, toner in which the projection portions made of organosilicon polymer are formed on the surface of each of the toner particles. However, this technique can be useful for a case where the toner which does not contain the organosilicon polymer, and for a case where the toner in which the projection portions are not formed on the surface of each of the toner particles is used. Specifically, the developer may be any developer as long as the effect for facilitating the toner to melt and caused by the reduction of the projection portions, formed on the surface layer of each toner particle, and the external additive, and by the increase in exposed portions of the toner base particle is larger than the effect for inhibiting the toner from melting and caused by the external additive buried in the toner particles. For example, the amount of addition of the external additive may be decreased. In addition, since the external additive is suppressed from being buried in the toner particles if the toner particles have high surface hardness, each of the toner particles may have a core-shell structure. In this case, the surface layer of each toner particle may have a hardness almost equal to or larger than the hardness of the main component of the external additive. In another case, a known external additive with a property that causes the external additive to less bury in the toner base particles may be used. In another case, the reduction in the amount of coating by the external additive may be facilitated by decreasing the strength in which the external additive is added to the toner base particles (i.e., the sticking strength of the external additive to the toner base particles) (specifically, the reduction in the amount of coating by the external additive may be facilitated, for example, by decreasing the agitating speed or agitating time when the external additive is added to the toner base particles).

By the way, as described above, the image forming apparatus 100 of the first embodiment uses a cleanerless system that collects the transfer residual toner in the developing apparatus 3 and reuses the transfer residual toner. In the image forming apparatus that uses the cleanerless system, the transfer residual toner that has been rubbed against the transfer portion and the like and has received the mechanical stress is reused. Thus, in the image forming apparatus that uses the cleanerless system, the ratio of toner particles whose projection portions formed on the toner surface is reduced easily increases, compared with the ratio of the toner particles of the same toner used in an image forming apparatus that includes a cleaning apparatus. That is, in the image forming apparatus that uses the cleanerless system, the effect for facilitating the toner to melt and caused by the reduction of the projection portions formed on the surface layer of each of the toner particles is easily increased. Thus, by applying the fixing-temperature control of the first embodiment to the image forming apparatus 100 that uses the cleanerless system, the power consumption, among others, can be reduced while the good fixability can be kept. However, the system to which this technique can be applied is not intended to be limited to the cleanerless system. That is, this technique can also be applied to an image forming apparatus that includes a cleaning apparatus.

Second Embodiment

In a second embodiment, the description will be made for a configuration in which a plurality of types of toner pack 35 can be used. Hereinafter, a component given a reference symbol identical to a reference symbol of a component of the first embodiment has substantially the same structure and effect as those of the component of the first embodiment, unless otherwise specified.

In an image forming apparatus 100 of the present embodiment, the toner can be supplied by using a plurality of types of toner pack 35 whose capacities for the toner are different from each other. That is, the image forming system of the present embodiment differs from the image forming system of the first embodiment in that the image forming system of the present embodiment includes the plurality of types of toner pack 35 whose capacities for the toner are different from each other.

The fixing-temperature control performed by the control portion 90 (FIG. 5) of the image forming apparatus 100 is the same as that of the first embodiment. That is, the control portion 90 controls the fixing temperature T depending on the toner remaining amount M detected by the toner-remaining-amount sensor 38, such that the fixing temperature T is decreased as the toner remaining amount M decreases (FIG. 6A).

As the toner pack 35, three types of toner pack 35 (i.e., a small-volume toner pack, a medium-volume toner pack, and a large-volume toner pack) were prepared. The small-volume toner pack was filled with toner whose amount corresponds to images conforming to ISO 19752 and formed on 1,000 sheets. The medium-volume toner pack was filled with toner whose amount corresponds to images conforming to ISO 19752 and formed on 2,500 sheets. The large-volume toner pack was filled with toner whose amount corresponds to images conforming to ISO 19752 and formed on 5,000 sheets. In the durability test, the three types of toner pack 35 were used sequentially, and an operation in which the toner is supplied immediately before the toner remaining amount becomes Mout was repeated. The other details of the durability test are the same as those of the first embodiment.

Figure 8:
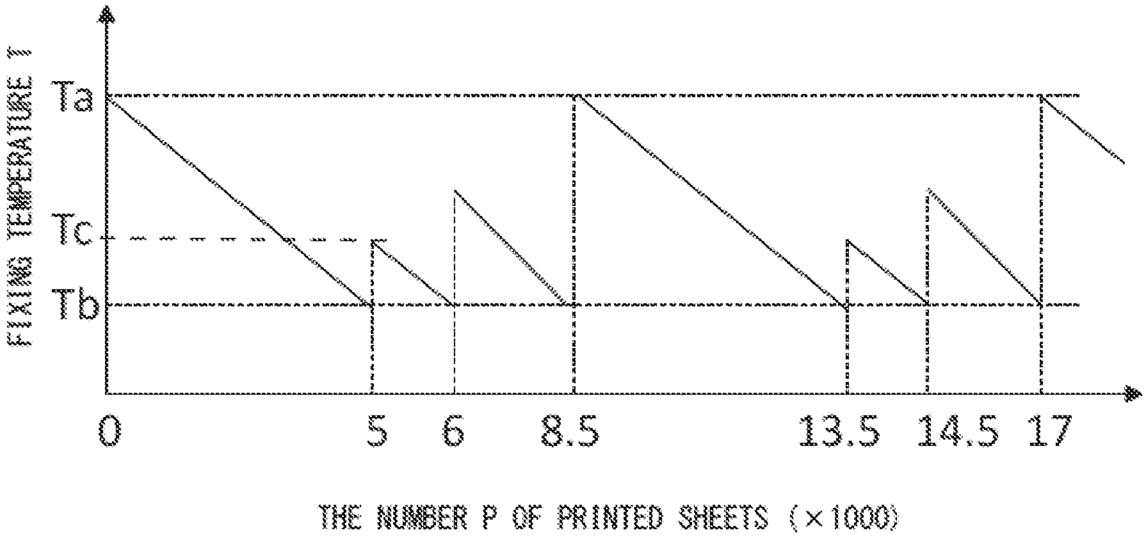
FIG. 8 is a diagram illustrating an example of change in the fixing temperature, in a second embodiment.

FIG. 8 illustrates the change in the fixing temperature T in the durability test of the second embodiment. In the present embodiment, the failure of fixing did not occur in the period of time of the durability test. In addition, since the fixing temperature T is set in accordance with the toner remaining amount M as in the first embodiment, the power consumption was able to be made lower than the power consumption measured in a case where the fixing temperature T is kept at Ta as in the Comparative Example 1.

That is, also in the second embodiment, the power consumption can be reduced while the good fixability can be obtained.

By the way, if a small amount of toner is supplied to the developer container 33, the ratio of the fresh toner to the toner contained in the developer container 33 (i.e., the developer storage portion) immediately after the supply of toner is low. Thus, the sufficient fixability can be obtained even if the fixing temperature T is lower than Ta. In contrast, if a large amount of toner is supplied to the developer container 33, the ratio of the fresh toner to the toner contained in the developer container 33 immediately after the supply of toner is high. Thus, in this case, the sufficient fixability can be more reliably obtained if the fixing temperature T is set closer to Ta. Thus, in a case where the plurality of types of toner pack 35 whose capacities for the toner are different from each other is used, the fixability of toner in the low-temperature range varies depending on the amount of toner supplied.

In the second embodiment, since the fixing temperature T is set in accordance with the toner remaining amount M, the fixing temperature T obtained after the supply of toner is also set in accordance with the toner remaining amount M obtained after the supply of toner and varying depending on the amount of toner supplied. That is, the target temperature is set such that the rise in the target temperature obtained when the developer is supplied to the developer storage portion by a first supply amount is smaller than the rise in the target temperature obtained when the developer is supplied to the developer storage portion by a second supply amount larger than the first supply amount. In this manner, the fixing temperature T can be appropriately set in accordance with the fixability of toner in the low-temperature range, obtained immediately after the supply of toner and varying depending on the amount of toner supplied. As a result, the power consumption can be made lower than the power consumption measured in a configuration in which the fixing temperature T is reset to Ta if the toner is supplied to the toner storage portion, regardless of the toner remaining amount M obtained immediately after the supply of toner.

In other words, in the second embodiment, as in the first embodiment, if the above-described developer amount is increased from the second amount or an amount smaller the second amount, to the first amount by supplying the developer, the above-described target temperature is set at a third temperature higher than the second temperature. In addition, in the second embodiment, if the above-described developer amount is increased from the second amount or an amount smaller the second amount, to a third amount larger than the second amount and smaller than the first amount by supplying the developer, the above-described target temperature is set at a fourth temperature higher than the second temperature and lower than the third temperature. For example, if the first amount is denoted by Mmax and the second amount is denoted by Mout, and the toner is supplied from the small-volume toner pack when the toner remaining amount M is Mout, the toner remaining amount M becomes the third amount larger than Mout (i.e., the second amount) and smaller than Mmax (i.e., the first amount). In this case, as illustrated in FIG. 8, the fixing temperature (or the target temperature) is set at Tc (i.e., the fourth temperature) higher than Tb (i.e., the second temperature) and lower than Ta (i.e., the third temperature).

Third Embodiment

Next, a third embodiment will be described. In the third embodiment, the method of the fixing-temperature control differs from that of the first embodiment. Hereinafter, a component given a reference symbol identical to a reference symbol of a component of the first embodiment has substantially the same structure and effect as those of the component of the first embodiment, unless otherwise specified.

In the above-described first embodiment, if the toner remaining amount M has the same value, the fixing temperature T is set at the same value (see FIG. 6A) even if the number P of printed sheets has a different value. In practice, however, even if the toner remaining amount M has the same value, the state of toner contained in the developer container 33 that has still not been supplied with toner is different from the state of toner contained in the developer container 33 that has been supplied with toner repeatedly.

Figure 10:
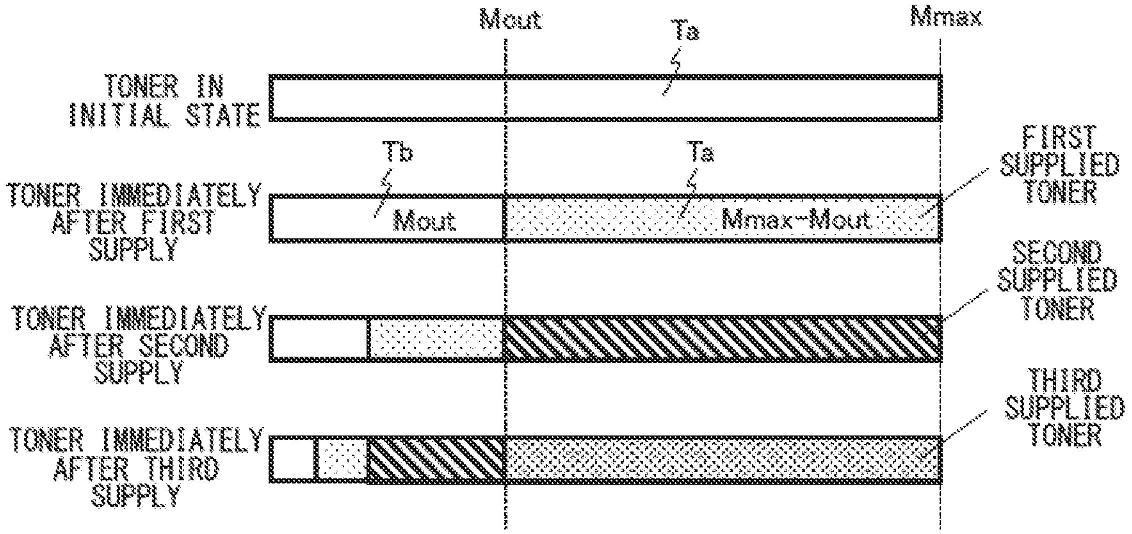
FIG. 10 is a diagram illustrating the change in components of toner of a developer container, caused by the supply of toner.

FIG. 10 illustrates the ratio of a toner component obtained when the toner is supplied until the toner remaining amount M becomes Mmax every time the toner remaining amount M decreases to Mout. In the initial state, the developer container 33 is filled with fresh toner. If the toner remaining amount M decreases to Mout, the first supply of toner is performed. In the developer container 33 immediately after the first supply of toner, the fresh toner supplied and an old toner present also before the first supply of toner are mixed with each other. Even after the second or the third supply of toner, in the developer container 33 immediately after the supply of toner, the fresh toner supplied and an old toner present also before the supply of toner are mixed with each other.

In the present embodiment, the deterioration state of toner depends on the number of times in which the toner is rubbed against the developing blade 36. The number of times correlates with an accumulated rotation distance D (i.e., the accumulated number of rotations) of the developing roller 31. Thus, in the present embodiment, in addition to the control of the fixing temperature T based on the toner remaining amount M, the control of the fixing temperature T based on the rotation distance D is performed such that the fixing temperature T decreases as the rotation distance D increases. Specifically, the fixing temperature T of the present embodiment is a value obtained by subtracting (k×D°) C from the fixing temperature T of the first embodiment. The parameter k is a correction coefficient. The relationship between the toner remaining amount M and the fixing temperature T (C) of the present embodiment is expressed by the following equation (3).

$$T = Tb + C \times (M - Mout) - k \times D \quad (3)$$

In the equation (3), C=(Ta−Tb)/(Mmax−Mout). A method of determining the correction coefficient k will be described below.

Figure 9:
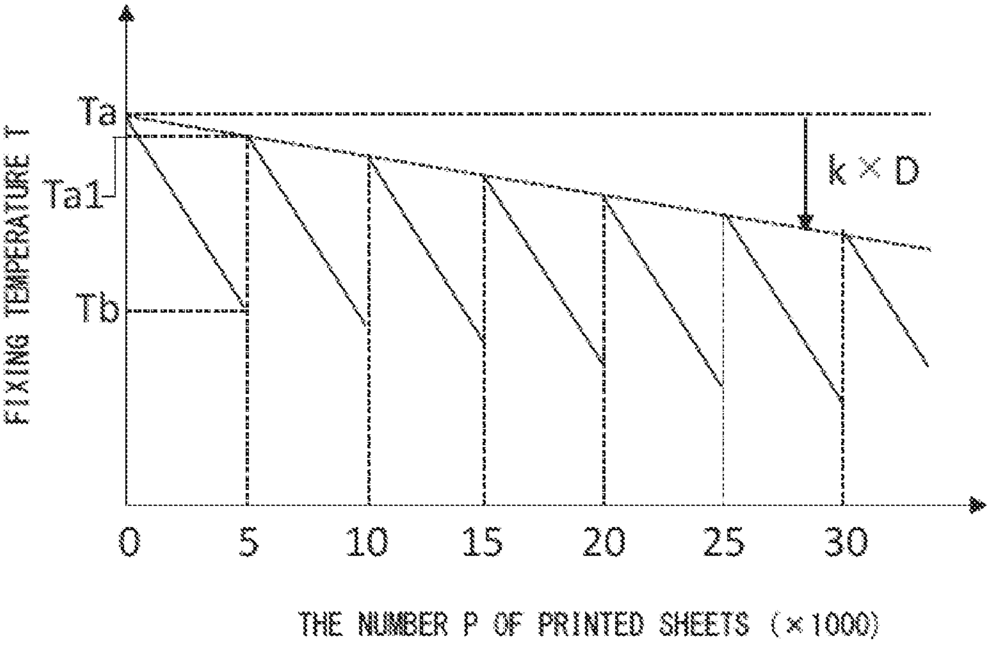
FIG. 9 is a diagram illustrating an example of change in the fixing temperature, in a third embodiment.

FIG. 9 illustrates the change in the fixing temperature T, obtained by conducting a durability test. In the durability test, conditions other than the above-described fixing-temperature control are the same as those of the first embodiment. In the present embodiment, as a result of the control based on the rotation distance D of the developing roller 31, the fixing temperature T is made lower than the fixing temperature T in the first embodiment as the number P of printed sheets increases. In the present embodiment, the power consumption was reduced from the power consumption measured in the first embodiment, by about 5%. During the durability test, the solid black image was outputted every time the number P of printed sheets increased by 1,000, and before and after the toner was supplied, for checking the fixability. As a result, the failure of fixing did not occur in the period of time of the durability test.

That is, also in the third embodiment, the power consumption can be reduced while the good fixability can be obtained.

The correction coefficient k can be determined, for example, as described below. When the toner is supplied repeatedly in the present embodiment, the ratio of a toner component changes, as illustrated in FIG. 10. In the initial state, the developer container 33 is filled with fresh toner. The fixing temperature T at which the power consumption can be suppressed and the good fixability of the fresh toner can be obtained is Ta. When the toner in the initial state decreases and the toner remaining amount becomes Mout (that is, immediately before the first supply of toner is performed), the fixing temperature T at which the power consumption can be suppressed and the good fixability of the toner can be obtained is Tb. The rotation distance D of the developing roller 31 obtained immediately before the first supply of toner is defined as D1.

If the first supply of toner is performed, the toner remaining amount M of the developer container 33 becomes Mmax. The amount of toner supplied is Mmax−Mout. Since the newly supplied toner is fresh, the fixing temperature T at which the power consumption can be suppressed and the sufficient fixability of the fresh toner can be obtained is Ta. That is, in a state immediately after the first supply of toner, the toner whose appropriate fixing temperature T is Ta and the toner whose appropriate fixing temperature T is Tb are mixed with each other at a ratio of (Mmax−Mout):Mout. Thus, the value Ta1 of the fixing temperature T at which the power consumption can be suppressed and the sufficient fixability of the toner can be obtained in a state immediately after the first supply of toner is expressed by the following equation.

$$Ta1 = Tb + (Ta - Tb) \times (Mmax - Mout)/Mmax$$

By using the above-described fixing temperature Ta1, the correction coefficient k of the present embodiment is expressed by the following equation.

$$k=(Ta-Ta1)/D1$$

According to the above-described equation, the correction coefficient k is set so that the fixing temperature T is decreased by Ta–Ta1 every time the rotation distance D of the developing roller 31 increases by D1.

That is, in the present embodiment, the target temperature (i.e., the fixing temperature T) is controlled, as described below, in accordance with the developer amount (i.e., the toner remaining amount M). If the above-described developer amount is a first amount (e.g., Mmax), the above-described target temperature is set at a first temperature (Ta). In addition, if the above-described developer amount is a second amount (e.g., Mout) smaller than the first amount, the target temperature is set at a second temperature (Tb) lower than the first temperature. If the above-described developer amount becomes smaller than the second amount, a notification (i.e., a notification for supplying toner) for facilitating a user to supply the developer is performed. If the above-described developer amount is increased from the second amount or an amount smaller the second amount, to the first amount (Mmax) by supplying the developer, the above-described target temperature is set at a third temperature higher than the second temperature. In the present embodiment, the third temperature is the temperature (Ta1) higher than the second temperature and lower than the first temperature.

In practice, the fixing temperature T may deviate from a theoretical value due to variations in production lot or other various factors. FIG. 10 also illustrates a toner ratio of the developer container 33 obtained after the second supply of toner, and a toner ratio of the developer container 33 obtained after the third supply of toner. However, the toner ratio becomes complicated because toners with various deterioration states are mixed with each other by supplying the toner repeatedly. Thus, it is preferable that a parameter for decreasing the fixing temperature T in accordance with the rotation distance D of the developing roller 31 be determined, with the fixability being checked under a condition that is almost equal to a condition in a practical use.

In the present embodiment, the control is performed in accordance with the rotation distance D of the developing roller 31. That is, if the developer amount of the developer storage portion has the same value, the target temperature of the fixing apparatus is decreased as the accumulated amount of rotation of the developer bearing member increases. With this operation, the fixing temperature T can be more appropriately set in accordance with the actual deterioration state of toner, compared with the fixing temperature T in the first embodiment.

In the durability test of the present embodiment, an image with a coverage of 4% that conforms to ISO 19752 was repeatedly printed on sheets, and the operation for supplying the toner immediately before the toner remaining amount M reached Mout was repeated. Under practical conditions of use, however, an image with a higher coverage may be printed on sheets. In this case, since the amount of toner consumed for forming an image on a single sheet increases as the coverage increases, the number of image-formed sheets outputted in a period of time in which the toner remaining amount M decreases from Mmax to Mout decreases. That is, as images outputted before the first supply of toner is performed have a higher coverage, the toner has less deterioration at a timing at which the first supply of toner is performed. Thus, in the present embodiment, as the number of image-formed sheets outputted before the first supply of toner is performed decreases, the fall (k×D) in the fixing temperature T, controlled in accordance with the rotation distance D of the developing roller 31, decreases. In this manner, the fixing temperature T can be more appropriately set in accordance with the actual deterioration state of toner.

As an example, even in a case where the same number of image-formed sheets is outputted, the rotation distance D of the developing roller 31 in a job in which 100 image-formed sheets are continuously outputted is different from the rotation distance D of the developing roller 31 in jobs in which the output of two image-formed sheets is repeated intermittently until the number of outputted image-formed sheets reaches 100. This is because one job includes a preparatory operation (i.e., pre-rotation) performed before an image forming operation, and an operation (i.e., post-rotation) performed after the image forming operation. Thus, in the present embodiment, even in a case where the same number of image-formed sheets is outputted, as the rotation distance D of the developing roller 31 decreases due to the decrease in the number of jobs, the fall (k×D) in the fixing temperature T, controlled in accordance with the rotation distance D of the developing roller 31, decreases. In this manner, the fixing temperature T can be more appropriately set in accordance with the actual deterioration state of toner.

Modifications

In the above-described third embodiment, the description has been made, as an example, for the control for decreasing the fixing temperature T such that the fixing temperature T and the rotation distance D of the developing roller 31 has a linear relationship. However, the method of determining the amount of reduction of the fixing temperature T, performed in accordance with the rotation distance D, is not limited to this. For example, there may be a case where the newly supplied toner is more easily borne by the developing roller 31 than the old toner contained in the developer container 33 also before the supply of toner, and thus is used for the developing operation with priority. In this case, if the above-described equation (3) is used and the third term, −k×D (° C.), is subtracted from the fixing temperature T, the fixing temperature T may have a too low value in consideration of the deterioration state of the toner actually used for the developing operation, and the failure of fixing may occur.

Figure 11:
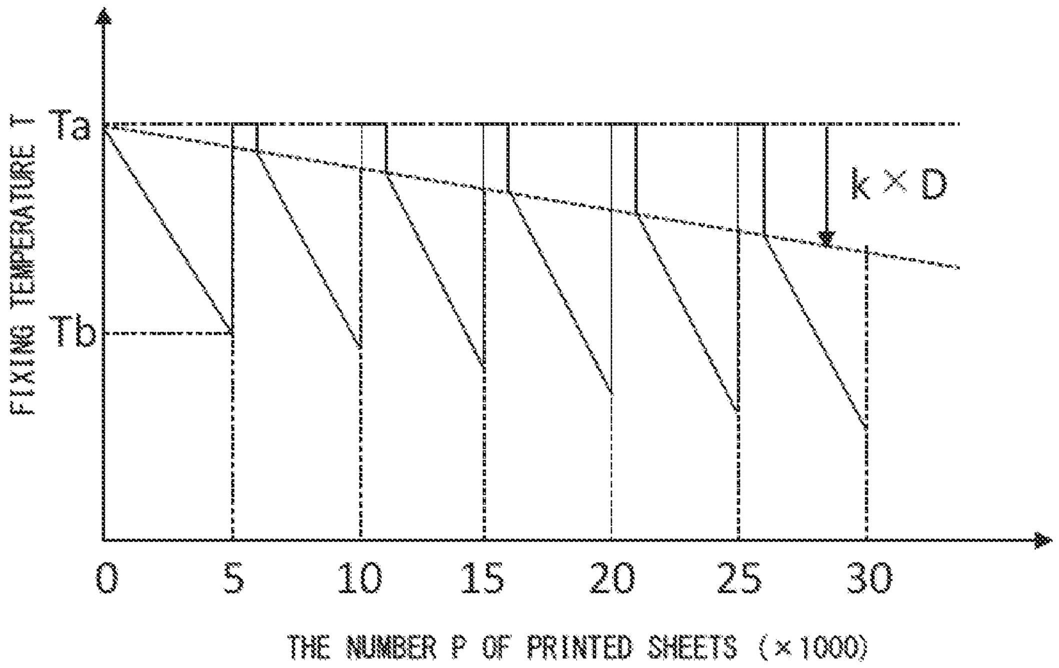
FIG. 11 is a diagram illustrating an example of change in the fixing temperature, in a modification.

Thus, in a modification, as illustrated in FIG. 11 as an example, the fixing temperature T may be kept at Ta for a predetermined period of time (in which images are formed, for example, on a few hundred of sheets) immediately after the supply of toner. After the predetermined period of time has elapsed since the time immediately after the supply of toner, the fixing temperature T may be determined, depending on the above-described equation (3). With this operation, the possibility that the failure of fixing will occur can be further reduced. In this case, however, the power consumption increases slightly, compared with the power consumption measured in the third embodiment. Thus, the application of the present modification may be determined in consideration of a specific risk of the failure of fixing the toner.

FIG. 11 illustrates one example of the fixing-temperature control that monotonously decreases the target temperature of the fixing apparatus in accordance with the decrease in the developer amount of the developer storage portion. That is, in the present disclosure, the relationship in which the target temperature is decreased monotonously in accordance with the decrease in the developer amount includes a relationship (i.e., a monotonic function in a broad sense) in which the target temperature is kept at a constant value when the developer amount is in a certain range.

Figure 12:
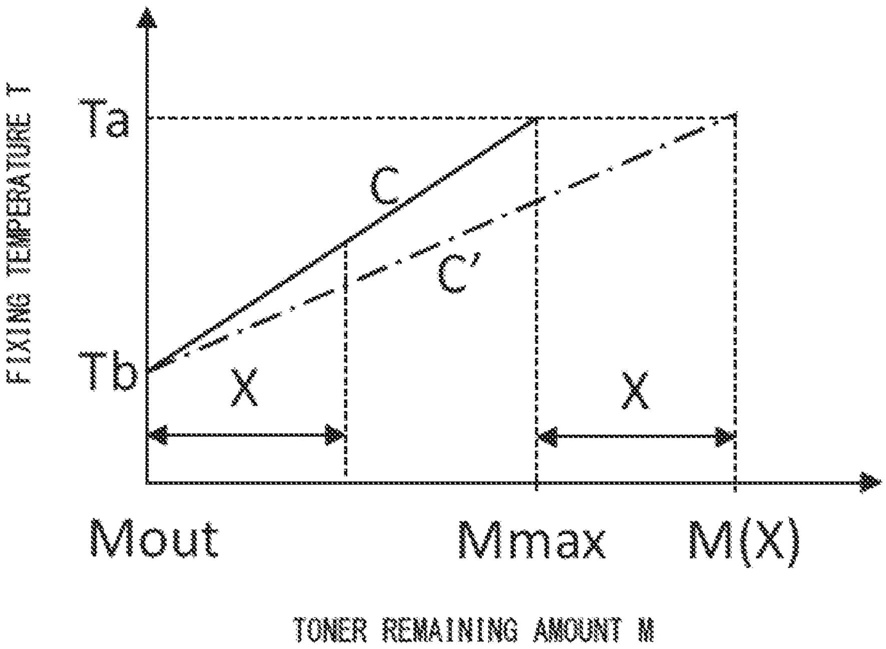
FIG. 12 is a diagram illustrating a relationship between the toner remaining amount and the fixing temperature in another modification.

In the first to the third embodiments, the operation in which the toner is supplied immediately before the toner remaining amount M becomes Mout is repeated. However, there may be a case where the toner is supplied when the toner remaining amount M is larger than Mout (M=Mout+X), and where the toner remaining amount M obtained after the supply of toner exceeds Mmax temporarily. In this case, if the toner remaining amount M obtained after the supply of toner is denoted by M(X), the fixing temperature T may be controlled as indicated by a dot-dash line of FIG. 12. That is, a slope C' may be set smaller than the slope of the first embodiment, the fixing temperature T may be decreased from Ta to Tb in a period of time in which the toner remaining amount M decreases from M(X) to Mout. That is, the slope of the graph that represents the relationship between the developer amount and the target temperature (i.e., the fixing temperature T) may be changed in accordance with the developer amount of the developer storage portion obtained immediately after the supply of toner. As the toner remaining amount M of the developer container 33 increases, the ratio of toner that passes through the nip portion of the developing blade 36, to the toner remaining amount M decreases, causing the toner deterioration to proceed slowly. Thus, by making the slope C' gentler than that in the first embodiment, the fixing temperature T can be more appropriately set in consideration of the difference in the toner deterioration speed that depends on the toner remaining amount M.

In the first to the third embodiments, the relationship between the toner remaining amount M and the fixing temperature T is linear, and in the third embodiment, the relationship between the rotation distance D of the developing roller 31 and the amount of correction of the fixing temperature T is also linear. However, these relationships may be nonlinear. For example, the fixing temperature T may be decreased such that the fixing temperature T and the amount of reduction of the toner remaining amount M have the relationship of a quadratic function. In another case, the fixing temperature T may be decreased such that the fixing temperature T and the rotation distance D of the developing roller 31 have the relationship of a quadratic function. In addition, the fixing temperature T may be decreased in a step-by-step manner with respect to the reduction of the toner remaining amount M (in this case, FIG. 6A will illustrate a stepped graph). In addition, the method of determining the fixing temperature T based on the toner remaining amount M and the rotation distance D of the developing roller 31 is not limited to the method in which the CPU 91 calculates the fixing temperature T by using a function. For example, the CPU 91 may refer to a lookup table stored, in advance, in a memory device such as a ROM. The lookup table represents the relationship between the toner remaining amount M and the fixing temperature T, and the relationship between the rotation distance D of the developing roller 31 and the amount of correction of the fixing temperature T. The details of the method of determining the fixing temperature T may be modified as appropriate in accordance with a specific property of toner.

In the third embodiment, the description has been made, as an example, for the rotation distance D of the developing roller 31, as a parameter that correlates with the deterioration state of toner. However, the amount of correction of the fixing temperature T may be determined, depending on another parameter. For example, the amount of correction of the fixing temperature T may be determined, depending on the rotation distance of the photosensitive drum 1 or the number P of sheets printed by the image forming apparatus 100, instead of the rotation distance D of the developing roller 31. Even in this case, the same advantages as those of the third embodiment can be produced.

In the first to the third embodiments, the description has been made for the image forming apparatus 100 and the image forming system, in which the toner is supplied from the outside of the image forming apparatus 100 to the developer container 33. However, the fixing-temperature control of the first embodiment or a modification of the first embodiment may be applied to an image forming apparatus with a cartridge system. In the cartridge system, the toner is supplied by replacing a toner cartridge that supplies the toner to the developing apparatus 3, a developing cartridge that corresponds to the developing apparatus 3 of the first embodiment, or a process cartridge that includes the developing apparatus 3 and the photosensitive drum 1. That is, the cartridge of the cartridge system has only to be one portion of the image forming portion that includes the developer storage portion that contains developer, and has only to be one portion of the image forming portion that can be detachably attached to the image forming apparatus 100.

In the cartridge system, the timing at which one cartridge is replaced with another can be regarded as the timing at which the toner is supplied in the first embodiment. Thus, the fixing-temperature control of the first embodiment can also be applied to the cartridge system. That is, the control portion decreases the target temperature monotonously as the developer amount decreases, and if the amount of developer is increased by replacing the cartridge, the control portion makes the target temperature higher than that obtained before the cartridge is replaced. In this manner, also in the cartridge system, the power consumption can be reduced while the good fixability can be obtained.

The above-described embodiments have been described for a monochrome printer, as an example. However, this technique may be applied to a direct-transfer color printer.

As described above, the present disclosure can provide an image forming apparatus that can reduce the power consumption while obtaining the good fixability.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-038574, filed on Mar. 13, 2023, which is hereby incorporated by reference herein in its entirety.

What is claimed is:

1. An image forming apparatus comprising:

an image forming portion including a developer storage portion configured to store developer, the image forming portion being configured to form an image on a recording material by using the developer;

a fixing apparatus configured to fix the image to the recording material by heating the image;

a detection portion configured to output a detection signal in accordance with a developer amount in the developer storage portion; and a control portion configured to control a target temperature of the fixing apparatus depending on the detection signal, wherein the developer storage portion is configured to be supplied with the developer from a supplying container that is outside the image forming apparatus, and wherein the control portion is configured to (i) set the target temperature at a first temperature if the developer amount is a first amount, (ii) set the target temperature at a second temperature lower than the first temperature if the developer amount is a second amount smaller than the first amount, and (iii) set the target temperature at a third temperature higher than the second temperature if the developer storage portion is supplied with the developer such that the developer amount is increased from the second amount to the first amount.

2. The image forming apparatus according to claim 1, wherein if the developer amount is equal to or smaller than the second amount, the control portion is configured to inform a user to supply the developer.

3. The image forming apparatus according to claim 1, wherein the developer contains toner particles, and wherein the toner particles each include a core and a surface layer, the core containing a binding resin and a coloring agent, the surface layer covering the core and including a projection portion that projects from a surface of each of the toner particles.

4. The image forming apparatus according to claim 3, wherein the projection portion contains organosilicon polymer, and wherein an average number of carbon atoms directly bound to a single silicon atom of the organosilicon polymer is equal to or larger than 1 and equal to or smaller than 3.

5. The image forming apparatus according to claim 4, wherein the organosilicon polymer has a unit structure expressed by a following formula (1), $$R\text{—}SiO_{3/2} \quad (1)$$

where R represents an alkyl group containing 1 to 6 carbon atoms or a phenyl group.

6. The image forming apparatus according to claim 1, wherein the third temperature is equal to the first temperature.

7. The image forming apparatus according to claim 1, wherein the control portion is configured to set the target temperature such that the target temperature decreases monotonously as the developer amount decreases.

8. The image forming apparatus according to claim 7, wherein the control portion is configured to set the target temperature such that the target temperature decreases with a predetermined slope as the developer amount decreases.

9. The image forming apparatus according to claim 8, wherein the control portion is configured to change the predetermined slope in accordance with the developer amount obtained immediately after the developer is supplied.

10. The image forming apparatus according to claim 1, wherein if the developer storage portion is supplied with the developer such that the developer amount is increased from the second amount to a third amount larger than the second amount and smaller than the first amount, the control portion is configured to set the target temperature at a fourth temperature higher than the second temperature and lower than the third temperature.

11. The image forming apparatus according to claim 1, wherein the third temperature is higher than the second temperature and lower than the first temperature.

12. The image forming apparatus according to claim 1, wherein the image forming portion further includes (i) an image bearing member configured to bear an electrostatic latent image and the image, (ii) a developer bearing member configured to bear the developer stored in the developer storage portion and supply the developer to the image bearing member for developing the electrostatic latent image into the image, and (iii) a blade member which is in contact with the developer bearing member and against which the developer borne by the developer bearing member is rubbed.

13. The image forming apparatus according to claim 12, wherein in cases where values of the developer amount are equal to each other, the control portion is configured to set the target temperature lower as an accumulated amount of rotation of the developer bearing member increases.

14. The image forming apparatus according to claim 1, wherein the image forming portion further includes (i) an image bearing member configured to bear an electrostatic latent image and the image, (ii) a developer bearing member configured to bear the developer stored in the developer storage portion and supply the developer to the image bearing member for developing the electrostatic latent image into the image, and (iii) a transfer member configured to transfer the image from the image bearing member to the recording material in a transfer portion, and wherein the developer bearing member is configured to collect the developer that has not been transferred to the recording material in the transfer portion, from the image bearing member into the developer storage portion.

15. The image forming apparatus according to claim 1, wherein the fixing apparatus includes (i) a tubular film, (ii) a nip forming member including a heater and disposed in an internal space of the film, the heater being configured to generate heat when energized, and (iii) a pressing roller configured to nip the film together with the nip forming member such that a nip portion is formed between the film and the pressing roller, and wherein the fixing apparatus is configured to heat the image formed on the recording material by using the film that is heated by heat conduction from the heater, while nipping and conveying the recording material in the nip portion by using the film and the pressing roller.

16. The image forming apparatus according to claim 1, wherein the detection portion includes (i) a light emitting portion configured to emit light and (ii) a light receiving portion configured to detect the light that is incident on the light receiving portion via an optical path that passes through an interior of the developer storage portion, and output the detection signal in accordance with an amount of the light.

* * * * *